US012598019B2

(12) United States Patent
Suzuki et al.

(10) Patent No.: US 12,598,019 B2
(45) Date of Patent: Apr. 7, 2026

(54) RECEIVING APPARATUS AND RECEIVING METHOD

(71) Applicant: NTT, Inc., Tokyo (JP)

(72) Inventors: Takahiro Suzuki, Musashino (JP);
Sang-Yuep Kim, Musashino (JP)

(73) Assignee: NTT, Inc., Tokyo (JP)

( * ) Notice: Subject to any disclaimer, the term of this patent is extended or adjusted under 35 U.S.C. 154(b) by 344 days.

(21) Appl. No.: 18/288,113

(22) PCT Filed: May 27, 2021

(86) PCT No.: PCT/JP2021/020237
§ 371 (c)(1),
(2) Date: Oct. 24, 2023

(87) PCT Pub. No.: WO2022/249401
PCT Pub. Date: Dec. 1, 2022

(65) Prior Publication Data
US 2024/0214105 A1　Jun. 27, 2024

(51) Int. Cl.
*H04J 14/06* (2006.01)
*H04B 10/61* (2013.01)

(52) U.S. Cl.
CPC ............ *H04J 14/06* (2013.01); *H04B 10/614* (2013.01)

(58) Field of Classification Search
CPC ............................... H04J 14/06; H04B 10/614
See application file for complete search history.

(56) References Cited

U.S. PATENT DOCUMENTS

2011/0268456 A1* 11/2011 Nakamoto ............. H04B 10/50
398/152
2011/0293266 A1 12/2011 Aoki
(Continued)

FOREIGN PATENT DOCUMENTS

| JP | 2011-250291 A | 12/2011 | |
| JP | 2015-103840 A | 6/2015 | |
| WO | WO-2022249401 A1 * | 12/2022 | ........... H04B 10/614 |

OTHER PUBLICATIONS

Kazuro Kikuchi, "Novel Coherent Optical Communication Technologies based on Digital Signal Processing", Laser Review, vol. 37, No. 3, pp. 164-170, Mar. 2009.
(Continued)

*Primary Examiner* — Tanya T Motsinger

(57) ABSTRACT
A reception device includes: a polarization separating unit configured to perform polarization-separation on reception signals respectively corresponding to an X-polarized wave a the Y-polarized wave, output from a receiving unit; a first signal decoding unit configured to decode a single-sequence transmission signal from the given reception signals; a second signal decoding unit configured to decode a two-sequence transmission signal from the given reception signals; and a reception signal comparison unit configured to determine whether change patterns in the reception signals respectively corresponding to the X-polarized wave and the Y-polarized wave separated by the polarization separating unit are similar to each other, output the reception signals obtained by polarization-separation by the polarization separating unit to the first signal decoding unit in a case where the change patterns are similar to each other, and output the reception signals obtained by polarization-separation by the polarization separating unit to the second signal decoding unit in a case where the change patterns are not similar to each other.

8 Claims, 12 Drawing Sheets

(56) References Cited

U.S. PATENT DOCUMENTS

| | | | | |
|---|---|---|---|---|
| 2012/0308233 A1* | 12/2012 | Hironishi | .............. | H04B 10/65 |
| | | | | 398/208 |
| 2014/0286638 A1* | 9/2014 | Yasuda | .................. | H04J 14/06 |
| | | | | 398/65 |
| 2015/0030330 A1* | 1/2015 | Ogasahara | .......... | H04B 10/613 |
| | | | | 398/65 |
| 2015/0110490 A1* | 4/2015 | Suzuki | .................. | H04B 10/65 |
| | | | | 398/65 |
| 2015/0139649 A1 | 5/2015 | Kikuchi | | |
| 2016/0241352 A1* | 8/2016 | Matsuda | ............ | H04B 10/5561 |
| 2024/0214105 A1* | 6/2024 | Suzuki | ................ | H04B 10/614 |
| 2024/0223298 A1* | 7/2024 | Suzuki | ................... | H04J 14/06 |
| 2024/0388377 A1* | 11/2024 | Suzuki | .............. | H04B 10/5161 |

OTHER PUBLICATIONS

T. Suzuki et al., "Demonstration of Fully Softwarized 10G-EPON PHY Processing on a General-Purpose Server for Flexible Access Systems", Journal of Lightwave Technology, vol. 38, No. 4, pp. 777-783, Feb. 2020.

Irshaad Fatadin et al., "Blind Equalization and Carrier Phase Recovery in a 16-QAM Optical Coherent System", Journal of Lightwave Technology, vol. 27, No. 15, Aug. 1, 2009.

* cited by examiner

RECEIVING APPARATUS AND RECEIVING METHOD

CROSS-REFERENCE TO RELATED APPLICATIONS

This application is a 371 U.S. National Phase of International Application No. PCT/JP2021/020237, filed on May 27, 2021. The entire disclosure of the above application is incorporated herein by reference.

TECHNICAL FIELD

The present invention relates to a reception device and a reception method.

BACKGROUND ART

A method of increasing communication capacity by polarization multiplexing has been used in order to implement high-speed optical transmission. By combining polarization multiplexing and digital coherent technology, it is possible to further increase the communication capacity. In the case of combining polarization multiplexing and digital coherent technology, it is possible to acquire information on optical complex amplitude in each of polarization directions. i.e. an X-direction and a Y-direction, on a receiving side, for example, by using a polarization diversity receiver to receive a polarization-multiplexed optical signal. It is also possible to demodulate a transmission signal applied as a modulation signal to each of an X-direction optical modulator and a Y-direction optical modulator during modulation on the transmission side, by performing digital signal processing for polarization separation on the acquired information on optical complex amplitude in each of polarization directions, i.e. the X-direction and the Y-direction (see NPL 1).

Conventionally, a transmission processing function requiring the processing of a whole main signal as described above and a larger calculation load has been implemented as a dedicated circuit, such as an application specific integrated circuit (ASIC). On the other hand, studies aimed at enhancing flexibility of communication devices according to user and application requirements by configuring a transmission processing function as software, and reducing capital expenditure (CAPEX) and operating expense (OPEX) in communication devices by adopting general-purpose hardware have been conducted in recent years (see, for example, NPL 2). For example, the transmission processing functions can be changed by configuring the functions as software as described above; however, it is essential to adaptively change the transmission processing functions while maintaining low latency for accommodating various transmission services in a single communication device.

Citation List

Non Patent Literature

[NPL 1]K. Kikuchi, "Novel Coherent Optical Communication Technologies based on Digital Signal Processing," Laser Review, Vol. 37, No. 3, pp. 164-170, March 2009
[NPL 2]T. Suzuki. S. Kim, J. Kani, et al., "Demonstration of Fully Softwarized 10G-EPON PHY Processing on a General-Purpose Server for Flexible Access Systems," Journal of Lightwave Technology, Vol.38, No.4, pp.7 77-783, February 2020

SUMMARY OF INVENTION

Technical Problem

FIG. 12 is a block diagram illustrating a configuration of a transmission system 600 that transmits general optical signals employing polarization multiplexing and digital coherent technology. In a transmission device 300, a polarization beam splitter 302 separates light outputs from a signal light source 301 into X-direction polarized light (hereinafter referred to as "X-polarized light") and Y-direction polarized light (hereinafter referred to as "Y-polarized light"). The polarization beam splitter 302 outputs the separated X-polarized light to an in-phase quadrature (IQ) modulation unit 303-1 and outputs the Y-polarized light to an IQ modulation unit 303-2.

The IQ modulation unit 303-1 modulates the X-polarized light based on a transmission signal given from a transmission signal generation unit 304-1. The IQ modulation unit 303-2 modulates the Y-polarized light based on a transmission signal given from a transmission signal generation unit 304-2. A polarization beam combiner 305 polarization-multiplexes the modulated optical signals in the X-direction and the Y-direction, respectively modulated by the IQ modulation units 303-1 and 303-2, and sends them to an optical fiber transmission path 500.

In a reception device 400, a coherent reception unit 402 receives an optical signal transmitted by the optical fiber transmission path 500. The reception device 400 performs coherent detection for the received optical signal using local oscillation light (hereinafter referred to as "local light") output from a local oscillation light source 401, and detects optical complex amplitude components in the X-direction and the Y-direction. The coherent reception unit 402 converts the detected optical complex amplitude components in the X-direction and the Y-direction into digital reception signals EK and $E_y$ in the X-direction and the-Y direction, respectively, and outputs them.

A clock synchronization unit 403 performs clock synchronization on the reception signals E, and Ey output from the coherent reception unit 402, thereby obtaining reception signals $E_x(n)$ and $E_y(n)$ at every sampling interval according to a clock signal. n is a sample number. The reception signals $E_x(n)$ and $E_y(n)$ which have been clock-synchronized by the clock synchronization unit 403 are subjected to signal detection by a signal detection unit 404, and further subjected to polarization-separation by a polarization separating unit 405.

The reception signal $E_x(n)$ in the X-direction and the reception signal $E_y(n)$ in the Y-direction after polarization separation are carrier-recovered by carrier recovery units 406-1 and 406-2, respectively, and then decoding processing such as symbol determination is performed by decoding units 407-1 and 407-2. Thereafter, a transmission signal used for modulation of polarized light in the X-direction, that is, a transmission signal generated by the transmission signal generation unit 304-1 and a transmission signal used for modulation of polarized light in the Y-direction. that is, a transmission signal generated by the transmission signal generation unit 304-2 are restored.

In the transmission system 600 for transmitting general optical signals employing the polarization multiplexing and digital coherent technology described above, the reception device 400 is configured on the assumption that the reception device 400 receives optical signals in which X-polarized light and Y-polarized light are modulated by different transmission signals. On the other hand, in a case where a smaller communication capacity is required by the user or the application, it is assumed that one of the X-polarized light and the Y-polarized light may be modulated by the transmission signal, for example. In such a case, if the reception device 400 always performs decoding processing on both the X-polarized light and the Y-polarized light, it means that arithmetic resources are wastefully used, leading to problems such as decreased resource efficiency and increased power consumption.

For solving the problems described above, for example, a method of previously notifying the reception device 400 of a modulation scheme applicable to an optical signal to be received is considered; however, this method requires a configuration for receiving a notification of the modulation scheme in the reception device 400, leading to the increased device size.

Considering such circumstances, an objective of the present invention is to provide a technology capable of demodulating a signal transmitted by a transmission device with a simple configuration while suppressing arithmetic resources used in a reception device even if a modulation scheme using polarized waves applied to the transmission device is unknown.

Solution to Problem

According to one aspect of the present invention, provided is a reception device, including: a receiving unit configured to receive a signal in which an X-polarized wave and a Y-polarized wave are polarization-multiplexed, convert the received signal into reception signals respectively corresponding to the X-polarized wave and the Y-polarized wave, and outputs the reception signals; a polarization separating unit configured to perform polarization-separation on the reception signals respectively corresponding to the X-polarized wave and the Y-polarized wave, output from the receiving unit; a first signal decoding unit configured to decode a single-sequence transmission signal from the given reception signals; a second signal decoding unit configured to decode a two-sequence transmission signal from the given reception signals; and a reception signal comparison unit configured to determine whether change patterns in the reception signals respectively corresponding to the X-polarized wave and the Y-polarized wave separated by the polarization separating unit are similar to each other, output the reception signals obtained by polarization-separation by the polarization separating unit to the first signal decoding unit in a case where the change patterns are similar to each other, and output the reception signals obtained by polarization-separation by the polarization separating unit to the second signal decoding unit in a case where the change patterns are not similar to each other.

According to one aspect of the present invention. provided is a reception method, including: by a receiving unit, receiving a signal in which an X-polarized wave and a Y-polarized wave are polarization-multiplexed, converting the received signal into reception signals respectively corresponding to the X-polarized wave and the Y-polarized wave, and outputting the reception signals; by a polarization separating unit, performing polarization-separation on the reception signals respectively corresponding to the X-polarized wave and the Y-polarized wave, output from the receiving unit; by a reception signal comparison unit, determining whether change patterns in the reception signals respectively corresponding to the X-polarized wave and the Y-polarized wave separated by the polarization separating unit are similar to each other. outputting the reception signals obtained by polarization-separation by the polarization separating unit to a first signal decoding unit in a case where the change patterns are similar to each other, and outputting the reception signals obtained by polarization-separation by the polarization separating unit to a second signal decoding unit in a case where the change patterns are not similar to each other; and by the first signal decoding unit, decoding a single-sequence transmission signal from the reception signals output by the reception signal comparison unit; and by the second signal decoding unit, decoding a two-sequence transmission signal from the reception signals output by the reception signal comparison unit.

Advantageous Effects of Invention

According to the present invention, it is possible to demodulate a signal transmitted by a transmission device with a simple configuration while suppressing arithmetic resources used in a reception device even if a modulation scheme using polarized waves applied to the transmission device is unknown.

DESCRIPTION OF EMBODIMENTS

First Embodiment

Figure 1:
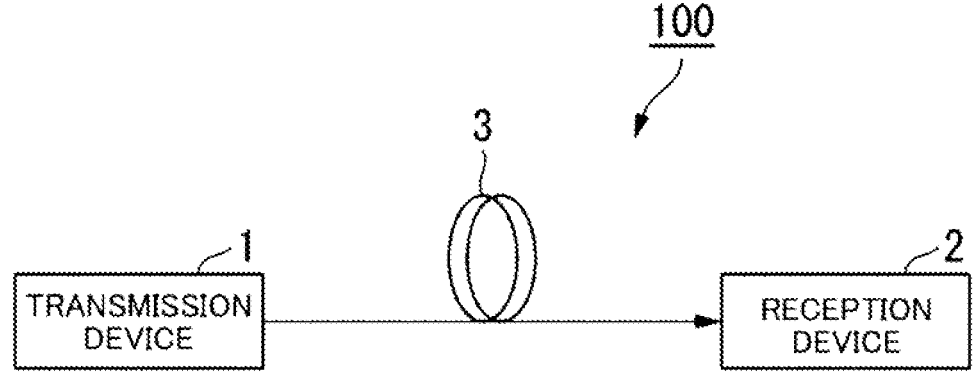
FIG. 1 is a block diagram illustrating a configuration of a transmission system of a first embodiment.

Hereinafter, embodiments of the invention will be described with referring to the accompanying drawings. FIG. 1 is a block diagram illustrating a configuration of a transmission system 100 of a first embodiment. The transmission system 100 includes a transmission device 1, a reception device 2, and an optical fiber transmission path 3. The optical fiber transmission path 3 connects the transmission device 1 and the reception device 2.

(Configuration of Transmission Device in First Embodiment)

Figure 2:
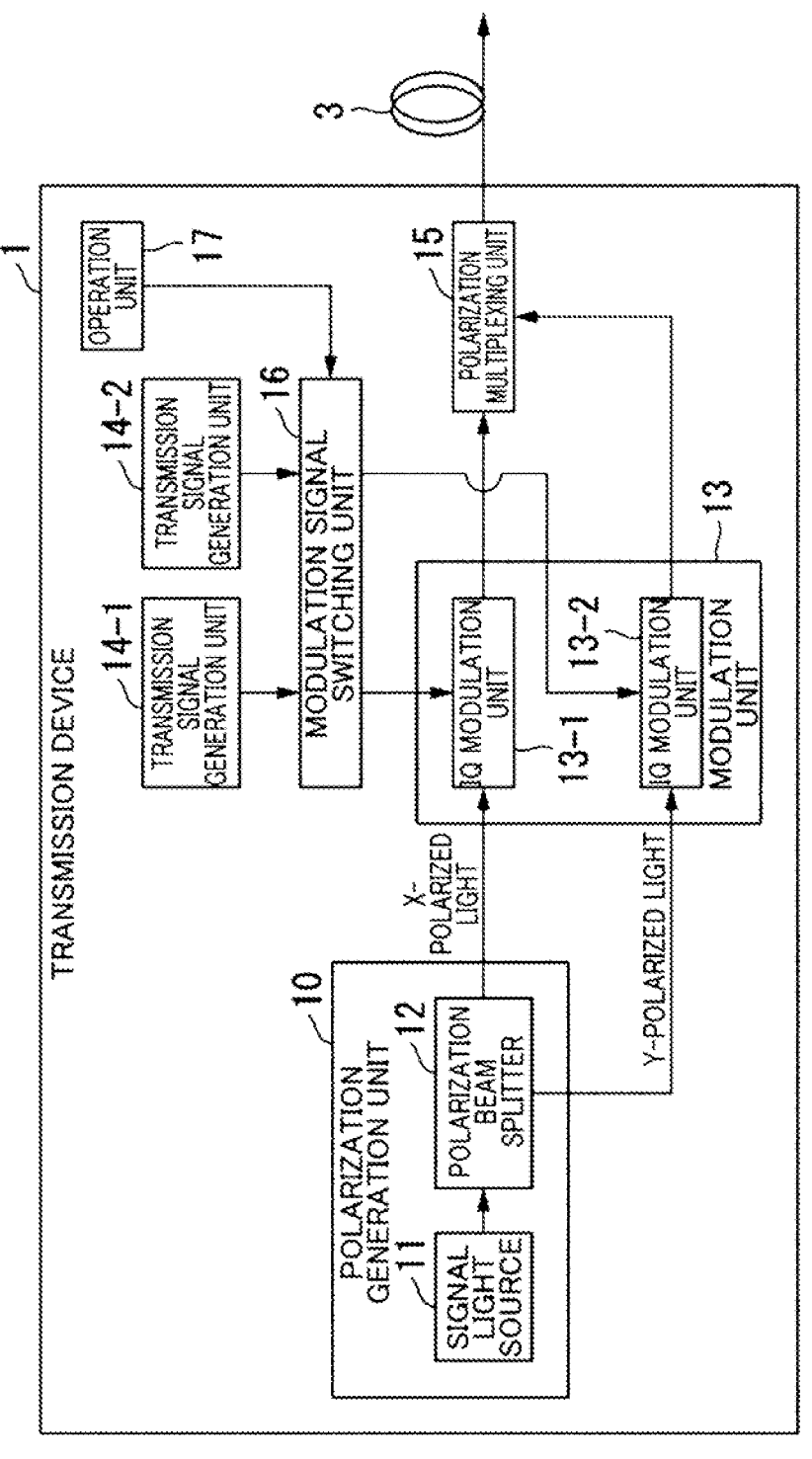
FIG. 2 is a block diagram illustrating a configuration of a transmission device according to the first embodiment.

FIG. 2 is a block diagram illustrating a configuration of the transmission device 1. The transmission device 1 includes: a polarization generation unit 10, a modulation unit 13, transmission signal generation units 14-1 and 14-2, a polarization multiplexing unit 15. a modulation signal switching unit 16, and an operation unit 17. The polarization generation unit 10 includes a signal light source 11 and a polarization beam splitter 12. The modulation unit 13 includes IQ modulation units 13-1 and 13-2.

The signal light source 1I generates and outputs continuous light that becomes a carrier wave. The polarization beam splitter 12 separates the continuous light output from the signal light source 11 into polarized light in an X-direction (hereinafter referred to as "X-polarized light") and polarized light in a Y-direction (hereinafter referred to as "Y-polarized light"). The X-polarized light separated by the polarization beam splitter 12 is input to the IQ modulation unit 13-1 and the Y-polarized light is input to the IQ modulation unit 13-2.

Each of the transmission signal generation units 14-1 and 14-2 generates sequences of transmission signals which are digital electric signals, and outputs the generated transmission signals to the modulation signal switching unit 16. The transmission signal generation units 14-1 and 14-2 generate different transmission signal sequences.

The operation unit 17 receives an operation front a user of the transmission system 100. and captures information indicating any one modulation scheme selected by the user from among three predetermined modulation schemes. The operation unit 17 outputs the captured information indicating the modulation scheme. Hereinafter, each of the three modulation schemes is referred to as a polarization multiplexing modulation scheme, a first single polarization modulation scheme, and a second single polarization modulation scheme.

The modulation signal switching unit 16 selectively outputs both or either of two transmission signals respectively generated by the transmission signal generation units 14-1 and 14-2 based on the information indicating a modulation scheme which is output by the operation unit 17. More specifically, the modulation signal switching unit 16 connects a connection end of the transmission signal generation unit 14-1 to a connection end of the IQ modulation unit 13-1, and a connection end of the transmission signal generation unit 14-2 to a connection end of the IQ modulation unit 13-2, in a case where the operation unit 17 outputs information indicating a polarization multiplexing modulation scheme as the information indicating a modulation scheme. The modulation signal switching unit 16 connects the connection end of the transmission signal generation unit 14-1 to the connection ends of the IQ modulation units 13-1 and 13-2. in a case where the operation unit 17 outputs information indicating a first single polarization modulation scheme as the information indicating a modulation scheme. The modulation signal switching unit 16 connects the connection end of the transmission signal generation unit 14-1 to the connection end of the 1Q modulation unit 13-1. in a case where the operation unit 17 outputs information indicating a second single polarization modulation scheme as the information indicating a modulation scheme.

The IQ modulation unit 13-1 phase-modulates the X-polarized Light given from the polarization beam splitter 12 based on the transmission signal output by the modulation signal switching unit 16. The IQ modulation unit 13-2 phase-modulates the Y-polarized light given from the polarization beam splitter 12 based on the transmission signal output by the modulation signal switching unit 16. It is assumed that each of the IQ modulation units 13-1 and 13-2 is provided with, for example, two MZ (machine-Zehnder) modulators, and a phase shifter for shifting a phase by 90 degrees is provided to an output of one MZ modulator. In this case, each of IQ modulation units 13-1 and 13-2 generates modulated signals of 1 and Q components from the transmission signal given to each of them. In each of the IQ modulation units 13-1 and 13-2. the modulated signals of the I and Q components am combined to generate an optical signal of QPSK (quadrature phase shift keying).

The polarization multiplexing unit 15 is, for example. a polarization beam combiner, and performs polarization multiplexing of a modulated optical signal of X-polarization output by the IQ modulation unit 13-1 and a modulated optical signal of Y-polarization output by the IQ modulation unit 13-2. In a case where the modulated optical signal of X-polarization and the modulated optical signal of Y-polarization are optical signals of QSPK. the modulated optical signal polarized and multiplexed by the polarization multiplexing unit 15 corresponds to an optical signal of polarization multiplexed QPSK. The polarization multiplexing unit 15 transmits the optical signal generated by polarization multiplexing to the optical fiber transmission path 3.

In the transmission device 1. for example, in a case where the operation unit 17 outputs the information indicating a polarization multiplexing modulation scheme to the modulation signal switching unit 16 by receiving the operation from the user, the 1Q modulation units 13-1 and 13-2 modulate the X-polarized light and the Y-polarized light respectively given on the basis of different transmission signals. Therefore, the optical signal generated by polarization multiplexing by the polarization multiplexing unit 15 is in a state in which different transmission signals are respectively superimposed on the X-polarized light and the Y-polarized light by modulation.

In the transmission device 1, in a case where the operation unit 17 outputs the information indicating a first single polarization modulation scheme to the modulation signal switching unit 16 by receiving the operation from the user, the IQ modulation units 13-1 and 13-2 respectively modulate the X-polarized light and the Y-polarized light given thereto based on the same transmission signal, that is, the transmission signal generated by the transmission signal generation unit 14-1. Therefore, the optical signal generated by polarization multiplexing by the polarization multiplexing unit 15 is in a state in which the same transmission signal is superimposed on each of the X-polarized light and the Y-polarized light by modulation. In this case, the transmission signal can be obtained by demodulating either the X-polarized light or the Y-polarized light, and the transmission signal can be substantially superimposed on a single polarized wave.

In the transmission device 1, in a case where the operation unit 17 outputs the information indicating a second single polarization modulation scheme to the modulation signal switching unit 16 by receiving the operation from the user, the IQ modulation unit 13-1 modulates the X-polarized light based on the transmission signal generated by the transmission signal generation unit 14-1. Therefore, the optical signal generated by polarization multiplexing by the polarization multiplexing unit 15 is in a state in which the transmission signal is superimposed on the X-polarized light but not on the Y-polarized light, that is, the transmission signal is superimposed on a single polarized wave.

(Configuration of Reception Device in First Embodiment)

Figure 3:
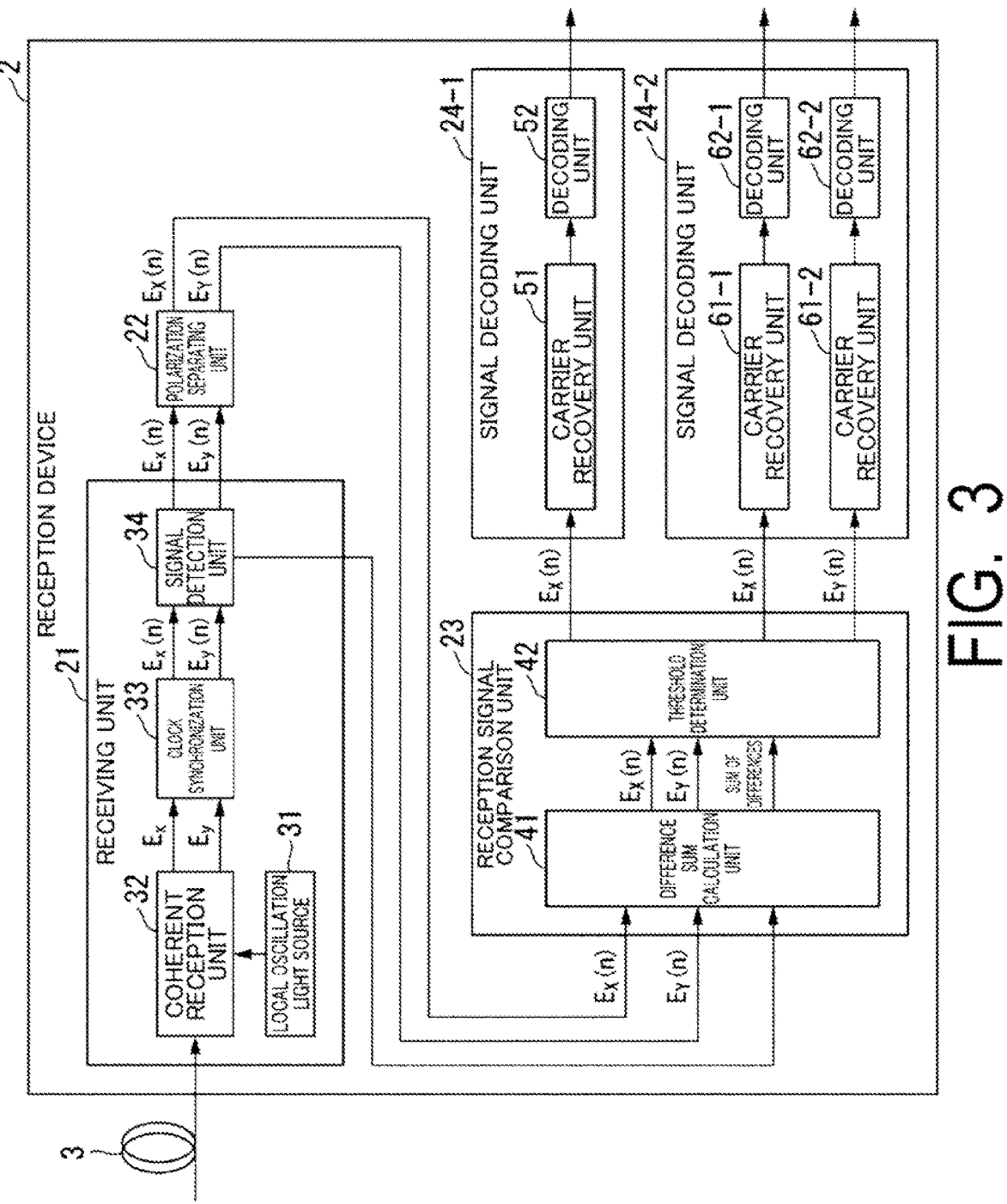
FIG. 3 is a block diagram illustrating a configuration of a reception device according to the first embodiment.

FIG. 3 is a block diagram illustrating a configuration of the reception device 2. The reception device 2 is provided with a receiving unit (receiver) 21, a polarization separating unit (polarization separator) 22, a reception signal comparison unit (reception signal comparer) 23, and signal decoding units (first signal decoder, second signal decoder) 24-1 and 24-2. The receiving unit 21 includes a local oscillation light source 31, a coherent reception unit 32, a clock synchronization unit 33, and a signal detection unit 34. The local oscillation light source 31 generates and outputs local light to the coherent reception unit 32.

The coherent reception unit 32 receives an optical signal transmitted by the optical fiber transmission path 3. The coherent reception unit 32 performs coherent detection on the received optical signal using local light emitted from the local oscillation light source 31, and generates a reception signal $E_x$ which is a digital electric signal in the X-direction and a reception signal $E_y$ which is a digital electric signal in the Y-direction from the received optical signal. More specifically, the coherent reception unit 32 separates local light output from the local oscillation light source 31 into the X-polarized light and the Y-polarized light. The coherent reception unit 32 detects an optical complex amplitude component corresponding to the X-polarized light from the received optical signal as an analogue electric signal on the basis of the received optical signal and the separated X-polarized light of the local light. The coherent reception unit 32 detects an optical complex amplitude component corresponding to the Y-polarized light from the received optical signal as an analogue electric signal on the basis of the received optical signal and the separated Y-polarized light of the local light. The coherent reception unit 32 converts the optical complex amplitude component corresponding to the X-polarized light into the reception signal $E_x$ which is a digital electric signal in the X-direction by performing A/D conversion on the optical complex amplitude component corresponding to the X-polarized light. The coherent reception unit 32 converts the optical complex amplitude component corresponding to the X-polarized light into the reception signal $E_y$ which is a digital electric signal in the Y-direction by performing A/D conversion on the optical complex amplitude component corresponding to the Y-polarized light.

The clock synchronization unit 33 performs clock synchronization processing on each of the reception signals $E_x$ and $E_y$ generated by conversion by the coherent reception unit 32. and corrects an error in a reference clock provided in each of the transmission device 1 and the reception device 2. With the clock synchronization processing by the clock synchronization unit 33, the reception signal $E_x(n)$ in the X-direction and the reception signal $E_y(n)$ in the Y-direction are obtained at every sampling interval according to a clock signal, n is a sample number.

The signal detection unit 34 detects a signal having an intensity value exceeding a predetermined intensity value among the reception signals $E_x(n)$ and $E_y(n)$. undergoing clock synchronization by the clock synchronization unit 33. The signal detection unit 34 outputs the detected signal and outputs signal detection information indicating that the signal having the intensity value exceeding the predetermined intensity value is detected. For example, the maximum intensity value in a state where the transmission device 1 does not transmit the optical signal is determined as the predetermined intensity value.

In a case where the optical signal transmitted by the transmission device 1 is an optical signal in which the X-polarized light and the Y-polarized light are polarization-multiplexed, polarization dispersion is generated by the effect of birefringence of the optical fiber in the middle of transmission of the optical signal through the optical fiber transmission path 3, and the two polarization-multiplexed signals are mixed. The polarization separating unit 22 performs polarization separation by filtering mixed components included in the reception signals $E_x(n)$ and $E_y(n)$.

Figure 4:
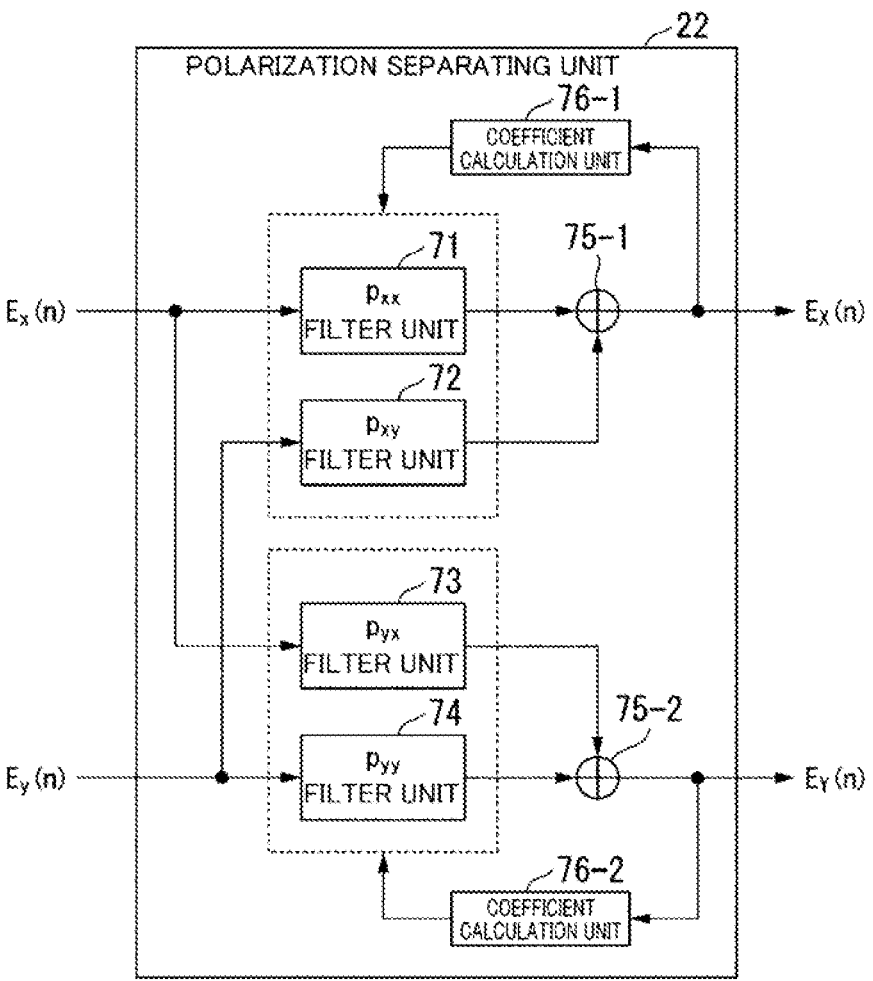
FIG. 4 is a block diagram illustrating a configuration of a polarization separating unit according to the first embodiment.

FIG. 4 is a block diagram illustrating a configuration of the polarization separating unit 22. The polarization separating unit 22 is a so-called butterfly FIR (finite impulse response) filter, including a $p_{xx}$ filter unit 71, a $p_{xy}$ filter unit 72, a $p_{yx}$ filter unit 73, a $p_{yy}$ filter unit 74. complex addition units 75-1 and 75-2. and coefficient calculation units 76-1 and 76-2.

The p filter unit 71, the $p_{xy}$ filter unit 72, the py, filter unit 73, and the $p_{yy}$ filter unit 74 are, for example, FIR filters. The $p_{xy}$ filter unit 71 takes in the reception signal $E_x(n)$ in the X-direction output by the signal detection unit 34. The pax filter unit 71 performs filtering processing for multiplying the reception signal $E_x(n)$ by a filter coefficient $p_{xx}(n)$.

The $p_{xy}$ filter unit 72 takes in the reception signal $E_y(n)$ in the Y-direction output by the signal detection unit 34. The $p_{xy}$ filter unit 72 performs filtering processing for multiplying the reception signal $_y(n)$ by a filter coefficient $p_{xy}(n)$.

The complex addition unit 75-1 adds the reception signal $E_x(n)$ subject to the filtering processing and output by the $p_{xx}$ filter unit 71 and the reception signal $E_y(n)$ subject to the filtering processing and output by the $p_{xy}$ filter unit 72. In a case where the filter coefficient $p_{xx}(n)$ of the $p_{xx}$ filter unit 71 and the filter coefficient $p_{xy}(n)$ of the $p_{xy}$ filter unit 72 are in optimum state by addition by the complex addition unit 75-1, a Y-direction component mixed with the reception signal $E_x(n)$ subject to the filtering processing is offset by the reception signal $E_y(n)$ subject to the filtering processing, thereby obtaining the reception signal $E_x(n)$ in the X-direction containing an X-direction component only.

The $p_{yx}$ filter unit 73 takes in the reception signal $E_x(n)$ in the X-direction output by the signal detection unit 34. The $p_{xy}$ filter unit 73 performs filtering processing for multiplying the reception signal $E_x(n)$ by a filter coefficient $p_{yx}(n)$. The $p_{yy}$ filter unit 74 takes in the reception signal $E_y(n)$ in the Y-direction output by the signal detection unit 34. The $p_{yy}$ filter unit 74 performs filtering processing for multiplying the reception signal $E_y(n)$ by a filter coefficient $p_{yy}(n)$.

The complex addition unit 75-2 adds the reception signal $E_x(n)$ subject to the filtering processing and output by the $p_{xy}$ filter unit 73 and the reception signal $E_y(n)$ subject to the filtering processing and output by the $p_{yy}$ filter unit 74. In a case where the filter coefficient $p_{yx}(n)$ of the $p_{yx}$ filter unit 73 and the filter coefficient $p_{yy}(n)$ of the $p_{yy}$ filter unit 74 are in optimum state by addition by the complex addition unit 75-2. an X-direction component mixed with the reception signal $E_y(n)$ subject to the filtering processing is offset by the reception signal $E(n)$ subject to the filtering processing, thereby obtaining the reception signal $E_y(n)$ in the Y-direction containing a Y-direction component only.

Since a polarization state of the optical signal changes over time during transmission through the optical fiber transmission path 3, it is necessary to perform polarization separation by adaptive control. The coefficient calculation units 76-1 and 76-2 calculate a coefficient for updating the filter coefficients $p_{xx}(n)$, $p_{xy}(n)$, $p_{yx}(n)$ and $p_{yy}y(n)$, respectively applicable to the $p_{xx}$ filter unit 71, the $p_{xy}$ filter unit 72, the $p_{yx}$ filter unit 73 and the $p_{yy}$ filter unit 74, at each sampling interval of the reception signals $E_x(n)$ and $E_y(n)$, to follow temporal change of the polarization state.

The coefficient calculation unit 76-1 takes in the reception signal $E_x(n)$ in the X-direction output by the complex addition unit 75-1. The coefficient calculation unit 76-1 calculates a coefficient value represented by the following Equation (1) based on the taken reception $E_x(n)$. The coefficient calculation unit 76-1 outputs the calculated coefficient value to the $p_{xx}$ filter unit 71 and the $p_{xy}$ filter unit 72.

[Math. 1]

$$\mu\left(1 - |E_X(n)|^2\right)E_X(n) \tag{1}$$

The coefficient calculation unit 76-2 takes in the reception signal $E_Y(n)$ in the Y-direction output by the complex addition unit 75-2. The coefficient calculation unit 76-2 calculates a coefficient value represented by the following Equation (2) based on the taken reception $E_y(n)$. The coefficient calculation unit 76-2 outputs the calculated coefficient value to the $p_{xy}$ filter unit 73 and the $p_{yy}$ filter unit 74. $\mu$ in Equations (1) and (2) is a step-size parameter.

[Math. 2]

$$\mu\left(1 - |E_Y(n)|^2\right)E_Y(n) \tag{2}$$

The $p_{xx}$ filter unit 71 takes in the coefficient value output from the coefficient calculation unit 76-1. Based on the taken efficient value, and a complex conjugate of a filter coefficient $p_{xx}(n)$ at a sample number n and the reception signal $E_x(n)$ in the X-direction at the sample number n, the $p_{xx}$ filter unit 71 calculates a filter coefficient $p_{xx}(n+1)$ corresponding to a sample number n+1 by the following Equation (3).

[Math. 3]

$$p_{xx}(n + 1) = p_{xx}(n) + \mu\left(1 - |E_X(n)|^2\right)E_X(n)E_x^*(n) \tag{3}$$

The $p_{xy}$ filter unit 72 takes in the coefficient value output from the coefficient calculation unit 76-1. Based on the taken efficient value, and a complex conjugate of a filter coefficient $p_{xy}(n)$ at a sample number n and the reception signal $E_y(n)$ in the Y-direction at the sample number n, the $p_{xy}$ filter unit 72 calculates a filter coefficient $p_{xy}(n+1)$ corresponding to a sample number n+1 by the following Equation (4).

[Math. 4]

$$p_{xy}(n + 1) = p_{xy}(n) + \mu\left(1 - |E_X(n)|^2\right)E_X(n)E_y^*(n) \tag{4}$$

The $p_{yx}$ filter unit 73 takes in the coefficient value output from the coefficient calculation unit 76-2. Based on the taken efficient value, and a complex conjugate of a filter coefficient $p_{yx}(n)$ at a sample number n and the reception signal $E_x(n)$ in the X-direction at the sample number n, the $p_{yx}$ filter unit 73 calculates a filter coefficient $p_{yx}(n+1)$ corresponding to a sample number n+1 by the following Equation (5).

[Math. 5]

$$p_{yx}(n + 1) = p_{yx}(n) + \mu\left(1 - |E_Y(n)|^2\right)E_Y(n)E_x^*(n) \tag{5}$$

The $p_{yy}$ filter unit 74 takes in the coefficient value output from the coefficient calculation unit 76-2. Based on the taken efficient value, and a complex conjugate of a filter coefficient $p_{yy}(n)$ at a sample number n and the reception signal $E_y(n)$ in the Y-direction at the sample number n, the $p_{yy}$ filter unit 74 calculates a filter coefficient $p_{yy}(n+1)$ corresponding to a sample number n+1 by the following Equation (6).

[Math. 6]

$$p_{yy}(n + 1) = p_{yy}(n) + \mu\left(1 - |E_Y(n)|^2\right)E_Y(n)E_y^*(n) \tag{6}$$

Thus, the polarization separating unit 22 performs polarization separation, which is adaptive to temporal changes in a polarization state, on the reception signals $E_x(n)$ and $E_y(n)$ detected by the signal detection unit 34.

In a case where the transmission device 1 performs transmission by the second single polarization modulation scheme, the transmission signal is superimposed on the X-polarized light but not on the Y-polarized light in the optical signal transmitted by the transmission device 1. In a case the reception device 2 receives the optical signal transmitted by the second single polarization modulation scheme, polarization separation is performed by the polarization separating unit 22, and thus the reception signal $E_x(n)$ in the X-direction and the reception signal $E_y(n)$ in the Y-direction have substantially the same amplitude value due to the filter characteristics in the polarization separating unit 22.

The reception signal comparison unit 23 determines whether change patterns of the reception signals $E_x(n)$ and $E_y(n)$ polarized by the polarization separating unit 22 are similar. The reception signal comparison unit 23 has a difference sum calculation unit 41 and a threshold determination unit 42.

When receiving the signal detection information from the signal detection unit 34, the difference sum calculation unit 41 selects reception signals $E_x(n)$ and $E_y(n)$ for a predetermined fixed period, i.e. by a predetermined number of samples being consecutive in time series, among reception signals $E_X(n)$ and $E_Y(n)$ subject to polarization separation by the polarization separating unit 22. The difference sum calculation unit 41 calculates an absolute difference in each combination of the reception signal $E_x(n)$ and the reception signal $E_Y(n)$ at the same sample number. The difference sum calculation unit 41 calculates the sum of several absolute differences calculated.

The threshold determination unit 42 determines whether a change pattern of the reception signal $E_x(n)$ and a change pattern of the reception signal $E_Y(n)$ are similar to each other in a predetermined fixed period, based on the sum of absolute differences calculated by the difference sum calculation unit 41 and a predetermined threshold.

In a case where it is determined that the change patterns are similar to each other, the threshold determination unit 42 outputs one of the reception signals $E_X(n)$ and $E_Y(n)$ to the signal decoding unit 24-1. FIG. 3 illustrates an example in which the threshold determination unit 42 outputs the reception signal $E_X(n)$. In a case where it is determined that the change patterns are not similar to each other, the threshold determination unit 42 outputs both the reception signals $E_X(n)$ and $E_Y(n)$ to the signal decoding unit 24-2.

The signal decoding unit 24-1 includes a carrier recovery unit 51 and a decoding unit 52, and decodes a single-sequence transmission signal from one of the reception signals $E_X(n)$ and $E_Y(n)$ output by the threshold determination unit 42. The signal decoding unit 24-2 includes carrier recovery units 61-1 and 61-2, as wells as decoding units 62-1 and 62-2, and decodes a two-sequence transmission signal from each of the reception signals $E_X(n)$ and $E_Y(n)$. Each of the carrier recovery units 51, 61-1 and 61-2 performs carrier recovery processing on the reception signal given front the reception signal comparison unit 23. including frequency offset compensation processing and phase compensation processing.

The frequency offset compensation processing is for, in a case where a center frequency of the signal light generated by the signal light source 11 provided in the transmission device 1 is deviated from a center frequency of the local light generated by the local oscillation light source 31 provided in the reception device 2, compensation of the deviation between the center frequencies. The phase compensation processing is for compensation of a phase difference between the signal light generated by the signal light source 11 provided in the transmission device 1 and the signal light generated by the local oscillation light source 31 provided in the reception device 2.

Each of the decoding units 52, 62-1 and 62-2 restores the transmission signal by performing decoding processing such as symbol determination on the reception signal after the carrier recovery processing is respectively performed by the carrier recovery units 51, 61-1 and 61-2 connected to the decoding units, respectively.

That is, the signal decoding unit 24-1 performs carrier recovery processing on one of the single-sequence reception signals $E_x(n)$ and $E_y(n)$ given front the reception signal comparison unit 23, and then decoding processing to restore the single-sequence transmission signal. The signal decoding unit 24-2 performs carrier recovery processing on each of the two-sequence reception signals $E_X(n)$ and $E_Y(n)$ given from the reception signal comparison unit 23, and then decoding processing to restore the two-sequence transmission signals respectively corresponding to the two-sequence reception signals.

(Processing by Transmission Device of First Embodiment)

Figure 5:
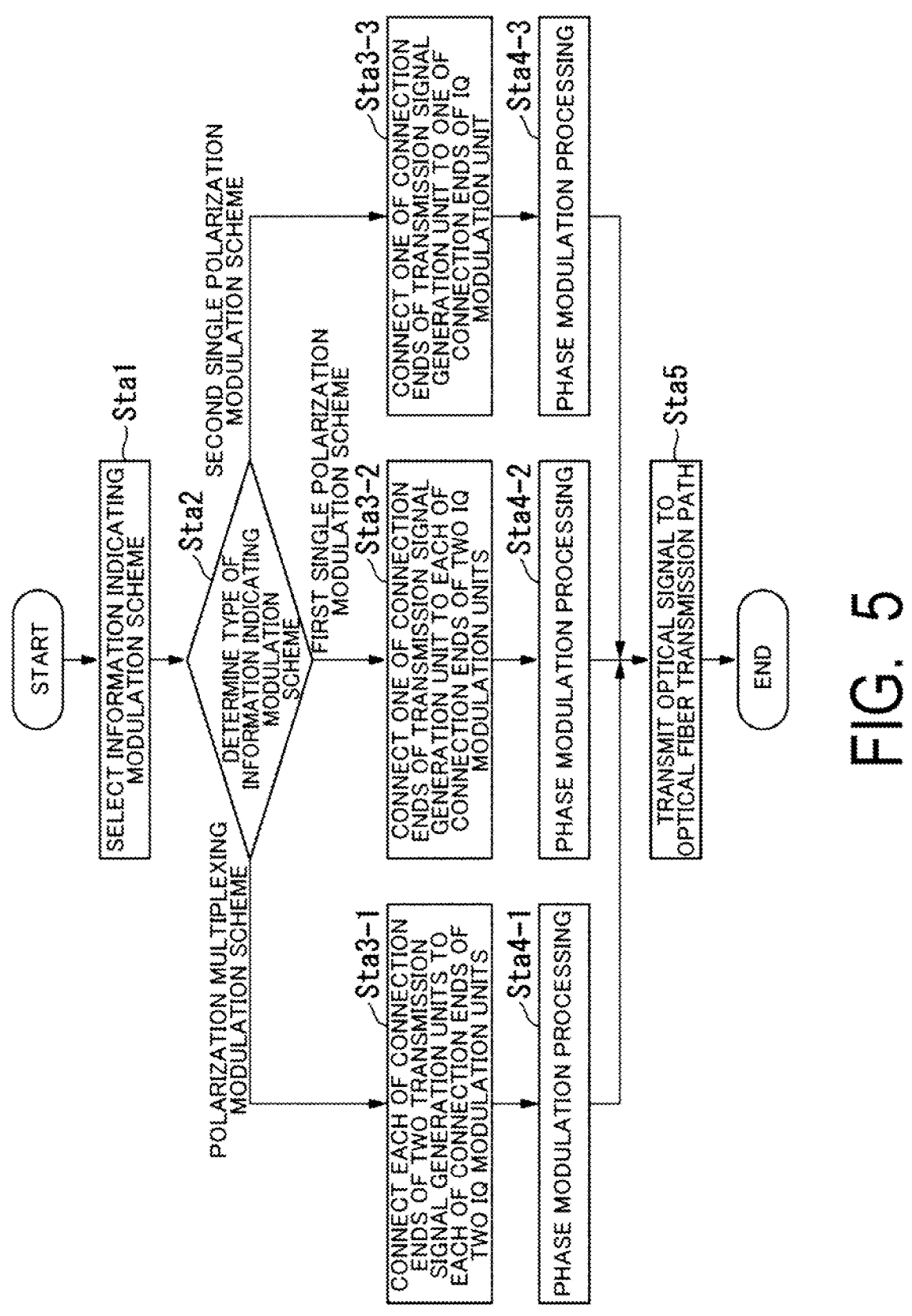
FIG. 5 is a diagram illustrating a flow of processing by the transmission device according to the first embodiment.

FIG. 5 is a flowchart illustrating a flow of processing by the transmission device 1. A user of the transmission device 1 operates the operation unit 17 to select any one of the polarization multiplexing modulation scheme, the first single polarization modulation scheme, and the second single polarization modulation scheme (step Sta1). In a case where the polarization multiplexing modulation scheme is selected, the operation unit 17 outputs information indicating the polarization multiplexing modulation scheme as information indicating a modulation system to the modulation signal switching unit 16. In a case where the first single polarization modulation scheme is selected, the operation unit 17 outputs information indicating the first single polarization modulation scheme as information indicating a modulation system to the modulation signal switching unit 16. In a case where the second single polarization modulation scheme is selected, the operation unit 17 outputs information indicating the second single polarization modulation scheme as information indicating a modulation system to the modulation signal switching unit 16.

The modulation signal switching unit 16 takes in the information indicating a modulation scheme output by the operation unit 17. The modulation signal switching unit 16 determines a type of the taken information indicating a modulation scheme (step Sta2). In a case where it is determined that the taken information indicating a modulation scheme is the information indicating the polarization multiplexing modulation scheme (step Sta2; polarization multiplexing modulation scheme), the modulation signal switching unit 16 connects the connection end of the transmission signal generation unit 14-1 to the connection end of the 1Q modulation unit 13-1, and connects the connection end of the transmission signal generation unit 14-2 to the connection end of the lQ modulation unit 13-2 (step Sta3-1). The IQ modulation unit 13-1 modulates the X-polarized light output from the polarization beam splitter 12 with a transmission signal generated by the transmission signal generation unit 14-1 given via the modulation signal switching unit 16. and outputs the modulated light to the polarization multiplexing unit 15. The IQ modulation unit 13-2 modulates the Y-polarized light output from the polarization beam splitter 12 with a transmission signal generated by the transmission signal generation unit 14-2 given via the modulation signal switching unit 16. and outputs the modulated light to the polarization multiplexing unit 15 (step Sta4-1).

In a case where it is determined that the taken information indicating a modulation scheme is the information indicating the first single polarization modulation scheme (step Sta2; first single polarization modulation scheme), the modulation signal switching unit 16 connects the connection end of the transmission signal generation unit 14-1 to the connection ends of the IQ modulation unit 13-1 and the IQ modulation unit 13-2 (step Sta3-2). The IQ modulation unit 13-1 modulates the X-polarized light output from the polarization beam splitter 12 with a transmission signal generated by the transmission signal generation unit 14-1 given via the modulation signal switching unit 16, and outputs the modulated light to the polarization multiplexing unit 15. The IQ modulation unit 13-2 modulates the Y-polarized light output from the polarization beam splitter 12 with a transmission signal generated by the transmission signal generation unit 14-1 given via the modulation signal switching unit 16, and outputs the modulated light to the polarization multiplexing unit 15 (step Sta4-2).

In a case where it is determined that the taken information indicating a modulation scheme is the information indicating the second single polarization modulation scheme (step Sta2; second single polarization modulation scheme), the modulation signal switching unit 16 connects the connection end of the transmission signal generation unit 14-1 to the connection end of the IQ modulation unit 13-1 (step Sta3-3). The IQ modulation unit 13-1 modulates the X-polarized light output from the polarization beam splitter 12 with a transmission signal generated by the transmission signal generation unit 14-1 given via the modulation signal switching unit 16, and outputs the modulated light to the polarization multiplexing unit 15. The IQ modulation unit 13-2 does not modulate since a transmission signal is not given by the modulation signal switching unit 16, and outputs the Y-polarized light output from the polarization beam splitter 12 to the polarization multiplexing unit 15 without modulation (step Sta4-3).

The polarization multiplexing unit 15 generates an optical signal by polarization-multiplexing the light output from each of the IQ modulation units 13-1 and 13-2, and transmits the generated optical signal to the optical fiber transmission path 3 (step Sta5).

Therefore, in a case where the user of the transmission system 100 selects the polarization multiplexing modulation scheme, the transmission device 1 transmits the optical signal in which the X-polarized light and the Y-polarized light are polarization-multiplexed in a state where the X-polarized light is modulated by the transmission signal generated by the transmission signal generation unit 14-1. and the Y-polarized light is modulated by the transmission signal generated by the transmission signal generation unit 14-2. In a case where the user of the transmission system 100 selects the first single polarization modulation scheme, the transmission device 1 transmits the optical signal in which the X-polarized light and the Y-polarized light are polarization-multiplexed in a state where each of the X-polarized light and the Y-polarized light is modulated by the transmission signal generated by the transmission signal generation unit 14-1. In a case where the user of the transmission system 100 selects the second single polarization modulation scheme, the transmission device 1 transmits the optical signal in which the X-polarized light and the Y-polarized light are polarization-multiplexed in a state where the X-polarized light is modulated by the transmission signal generated by the transmission signal generation unit 14-1 and the Y-polarized light is not modulated.

In the processing by the transmission device 1 of the first embodiment, it is assumed that the transmission signal generation units 14-1 and 14-2 continuously generate different transmission signals. In a case where the operation unit 17 outputs the information indicating the polarization multiplexing modulation scheme to the modulation signal switching unit 16, the operation unit 17 may output a transmission signal generation instruction signal instructing to activate generation of a transmission signal to each of the transmission signal generation units 14-1 and 14-2, and each of the transmission signal generation units 14-1 and 14-2 may activate generation of different transmission signals upon receiving the transmission signal generation instruction signal. In a case where the operation unit 17 outputs the information indicating the first or second single polarization modulation scheme to the modulation signal switching unit 16. the operation unit 17 may output a transmission signal generation instruction signal to the transmission signal generation unit 14-1 only since the transmission signal generated by the transmission signal generation unit 14-2 is not transmitted, and the transmission signal generation unit 14-1 may activate generation of a transmission signal upon receiving the transmission signal generation instruction signal.

For the transmission device 1 of the first embodiment, the modulation signal switching unit 16 connects the connection end of the transmission signal generation unit 14-1 to the connection end of the IQ modulation unit 13-1 in a case where the taken information indicating a modulation scheme is the information indicating the second single polarization modulation scheme, in step Sta3-3. The modulation signal switching unit 16 may comnect the connection end of the transmission signal generation unit 14-1 to the connection end of the IQ modulation unit 13-2 in the step Sta3-3. In this case, the polarization multiplexing unit 15 generates and transmits the optical signal in which the X-polarized light and the Y-polarized light arc polarization-multiplexed in a state where the Y-polarized light is modulated by the transmission signal generated by the transmission signal generation unit 14-1 and the X-polarized light is not modulated.

(Processing by Reception Device of First Embodiment)

Figure 6:
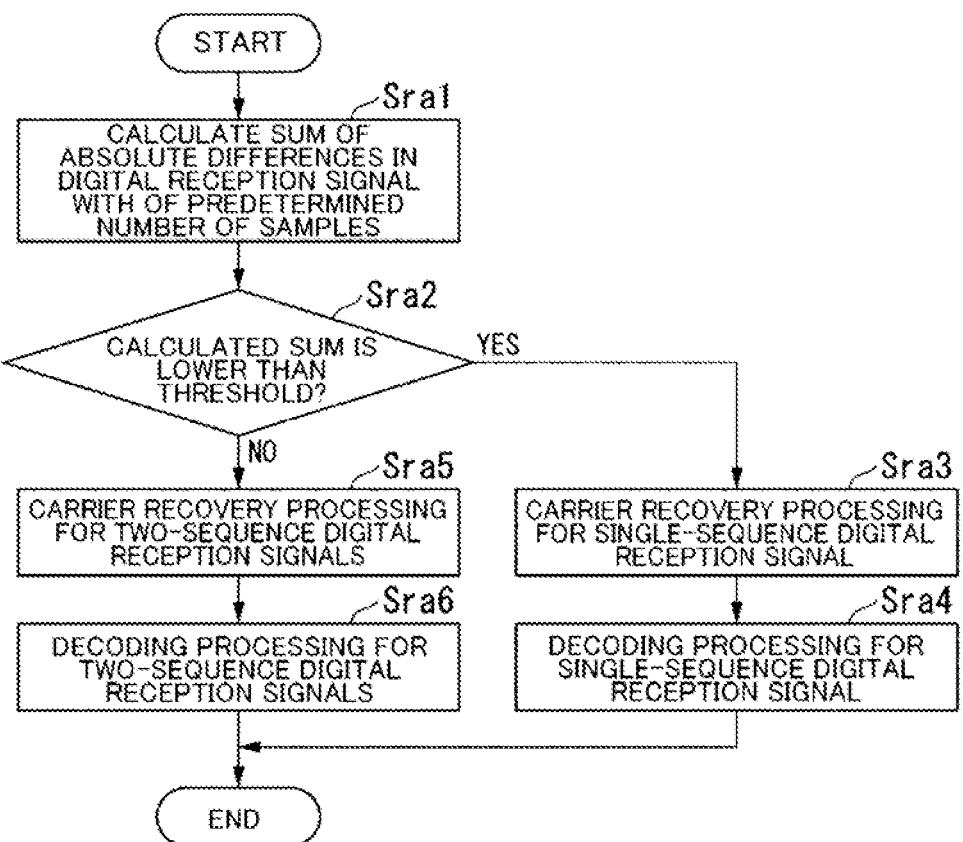
FIG. 6 is a diagram illustrating a flow of processing by the reception device according to the first embodiment.

FIG. 6 is a flowchart illustrating a flow of processing performed by the reception signal comparison unit 23 and the signal decoding units 24-1 and 24-2 in the reception device 2. Before the process shown in FIG. 5 is initiated, the following processes are executed.

The optical coherent reception unit 32 of the receiving unit 21 in the reception device 2 receives the optical signal transmitted by the transmission device 1 via the optical fiber transmission path 3. The coherent reception unit 32 performs coherent detection on the received optical signal using local light emitted from the local oscillation light source 31, and generates the reception signal $E_z$, in the X-direction and the reception signal $E_y$, in the Y direction from the received optical signal. The coherent reception unit 32 outputs the generated reception signals $E_x$ and $E_y$, to the clock synchronization unit 33.

The clock synchronization unit 33 takes in the reception signals $E_x$ and $E_y$, output from the coherent reception unit 32. The clock synchronization unit 33 performs clock synchronization on the taken reception signals $E_x$ and $E_y$, and generates the reception signals $E_x(n)$ and $E_y(n)$ at every sampling interval according to a clock signal. The clock synchronization unit 33 outputs the generated reception signals $E_x(n)$ and $E_y(n)$ to the signal detection unit 34.

The signal detection unit 34 takes in the reception signals $E_x(n)$ and $E_y(n)$ output from the clock synchronization unit 33. The signal detection unit 34 detects a signal having an intensity value exceeding a predetermined intensity value among the taken reception signals $E_x(n)$ and $E_y(n)$. The signal detection unit 34 outputs the detected signal to the polarization separating unit 22. and outputs signal detection information to the difference sum calculation unit 41 of the reception signal comparison unit 23. In a case where the signal detection unit 34 continuously detects the reception signals $E_x(n)$ and $E(n)$ having intensity values exceeding the predetermined intensity value, the signal detection unit 34 outputs the signal detection information for the precedent reception signals $E_x(n)$ and $E_y(n)$, but not for the subsequent reception signals $E_x(n)$ and $E_y(n)$.

The polarization separating unit 22 takes in the reception signals $E_x(n)$ and $E_y(n)$ output by the signal detection unit 34, performs polarization separation on the taken reception signals $E_x(n)$ and $E_y(n)$, and generates reception signals $E_X(n)$ and $E_Y(n)$ subject to polarization separation. The polarization separating unit 22 outputs the reception signals $E_x(n)$ and $E_Y(n)$ subject to polarization separation to the difference sum calculation unit 41 of the reception signal comparison unit 23.

While the transmission device 1 keeps transmitting the optical signal, the receiving unit 21 and the polarization separating unit 22 in the reception device 2 keep executing the processing above.

When the difference sum calculation unit 41 of the reception signal comparison unit 23 receives the signal detection information from the signal detection unit 34, the processing of the flowchart shown in FIG. 5 is initiated. The difference sum calculation unit 41 takes in the reception signals $E_X(n)$ and $E_Y(n)$ output from the polarization separating unit 22. The difference sum calculation unit 41 selects the reception signals $E_X(n)$ and $E_Y(n)$ by a predetermined number of samples being consecutive in time series, starting from the reception signals $E_X(n)$ and $E_Y(n)$ taken in at the time when receiving the signal detection information. The difference sum calculation unit 41 calculates an absolute difference in each combination of the reception signal $E_X(n)$ and the reception signal $E_Y(n)$ at the same sample number. The difference sum calculation unit 41 calculates the sum of several absolute differences calculated.

That is, in a case where a sample number i of the reception signals $E_X(i)$ and $E_Y(i)$ taken in by the difference sum calculation unit 41 at a time when receiving the signal detection information is "n", the sum of absolute differences is calculated by the following Equation (7) (step Sra1).

[Math. 7]

$$\sum_{i=n}^{n+(N-1)} |E_X(i) - E_Y(i)| \tag{7}$$

In Equation (7),N is a predetermined number of samples. N is an integer of 2 or more, and preferably, a value by which similarity of change patterns in the reception signals $E_X(n)$ and $E^Y(n)$ can be specified in advance. The difference sum calculation unit 41 outputs the taken reception signals $E_X(n)$ and $E_Y(n)$, as well as the sum of absolute differences, to the threshold determination unit 42. The threshold determination unit 42 takes in the reception signals $E_X(n)$ and $E_Y(n)$, as well as the sum of absolute differences, output by the difference sum calculation unit 41. The threshold determination unit 42 determines whether change patterns of the reception signals $E_X(n)$ and $E_Y(n)$ are similar to each other, based on whether the sum of absolute differences calculated by the difference sum calculation unit 41 is lower than a predetermined threshold (step Sra2).

In a case where the sum of absolute differences calculated by the difference sum calculation unit 41 is lower than the predetermined threshold, the threshold determination unit 42 determines whether the change patterns of the reception signals $E_X(n)$ and $E_Y(n)$ are similar to each other (step Sra2: YES). When the change patterns of the reception signals $E_X(n)$ and $E_Y(n)$ are similar to each other, it is understood as that the optical signal transmitted by the transmission device 1 is generated by the first single polarization modulation scheme or the second single polarization modulation scheme. Therefore, the threshold determination unit 42 outputs one of the taken reception signals $E_X(n)$ and $E_Y(n)$ to the signal decoding unit 24-1. In this case, the threshold determination unit 42 outputs the reception signals $E_X(n)$ to the signal decoding unit 24-1.

The carrier recovery unit 51 of the signal decoding unit 24-1 takes in the reception signal $E_X(n)$ output by the threshold determination unit 42, and performs carrier recovery processing on the taken reception signal $E_X(n)$. The carrier recovery unit 51 outputs the reception signal $E_X(n)$ subject to the carrier recovery processing to the decoding unit 52 (step Sra3).

The decoding unit 52 takes in the reception signal $E_x(n)$ subject to the carrier recovery processing and output by the carrier recovery unit 51. performs decoding processing on the taken reception signal $E_X(n)$, and restores the transmission signal generated by the transmission signal generation unit 14-1. The decoding unit 52 outputs the restored transmission signal to the outside (step Sra4).

Meanwhile, in a case where the sum of absolute differences calculated by the difference sum calculation unit 41 is not lower than the predetermined threshold, the threshold determination unit 42 determines that the change patterns of the reception signals $E_X(n)$ and $E_Y(n)$ are not similar to each other (step Sra2: NO). When the change patterns of the reception signals $E_X(n)$ and $E_Y(n)$ are not similar to each other, it is understood as that the optical signal transmitted by the transmission device 1 is generated by the polarization multiplexing modulation scheme. Therefore, the threshold determination unit 42 outputs the taken reception signal $E_x(n)$ to the carrier recovery unit 61-1 of the signal decoding unit 24-2, and outputs the taken reception signal $E_y(n)$ to the carrier recovery unit 61-2 of the signal decoding unit 24-2.

The carrier recovery unit 61-1 takes in the reception signal $E_x(n)$ output by the threshold determination unit 42, and performs carrier recovery processing on the taken reception signal $E_X(n)$. The carrier recovery unit 61-1 outputs the reception signal $E_x(n)$ subject to the carrier recovery processing to the decoding unit 62-1. The carrier recovery unit 61-2 takes in the reception signal $E_y(n)$ output by the threshold determination unit 42, and performs carrier recovery processing on the taken reception signal $E_y(n)$. The carrier recovery unit 61-2 outputs the reception signal $E_y(n)$ subject to the carrier recovery processing to the decoding unit 62-2 (step Sra5).

The decoding unit 62-1 takes in the reception signal $E_x(n)$ subject to the carrier recovery processing and output by the carrier recovery unit 61-1, performs decoding processing on the taken reception signal $E_X(n)$, and restores the transmission signal generated by the transmission signal generation unit 14-1. The decoding unit 62-2 takes in the reception signal $E_y(n)$ subject to the carrier recovery processing and output by the carrier recovery unit 61-2. performs decoding processing on the taken reception signal $E_Y(n)$, and restores the transmission signal generated by the transmission signal generation unit 14-2. The decoding units 62-1 and 62-2 output the restored transmission signals to the outside (step Sra6).

In the reception device 2 of the first embodiment, the signal decoding unit 24-1, which is a first signal decoding unit, restores a single-sequence transmission signal from one of the reception signals $E_x(n)$ and $E_Y(n)$. The signal decoding unit 24-2, which is a second signal decoding unit, restores a two-sequence transmission signal from the reception signals $E_x(n)$ and $E_y(n)$. When determination is made on whether the change patterns of the reception signals $E_x(n)$ and $E_y(n)$, polarization-separated by the polarization separating unit 22. are similar to each other, in a case where it is determined that the change patterns of the reception signals $E_x(n)$ and $E_y(n)$ are similar to each other, the reception signal comparison unit 23 output % one of the reception signals $E_x(n)$ and $E_Y(n)$, polarization-separated by the polarization separating unit 22, to the signal decoding unit 24-1. and if otherwise, outputs the reception signals $E_X(n)$ and $E_Y(n)$, polarization-separated by the polarization separating unit 22, to the signal decoding unit 24-2. Therefore, in a case where the reception signal comparison unit 23 determines that the received optical signal is modulated by the polarization multiplexing modulation scheme, the reception device 2 performs decoding processing using the signal decoding unit 24-2 which includes the two carrier recovery units 61-1 and 61-2, as well as the two decoding units 62-1 and 62-2. On the other hand, in a case where the reception signal comparison unit 23 determines that the received optical signal is modulated by the first or second single polarization modulation scheme, the reception device 2 performs decoding processing using the signal decoding unit 24-1 which includes the single carrier recovery units 51 and the single decoding unit 52. Consequently, since the reception device 2 switches and uses appropriate signal decoding units 24-1 and 24-2 according to the determination result of the reception signal comparison unit 23, arithmetic resources can be appropriately used, leading to enhanced resource efficiency and reduced power consumption. In other words, even if a modulation scheme using polarized waves applied to the transmission device 1 is unknown, the modulation scheme is specified based on a signal received by the reception device 2 to select arithmetic resources used in accordance with the specified modulation scheme, thus it is possible to demodulate a signal transmitted by the transmission device 1 with a simple configuration while suppressing arithmetic resources used.

Second Embodiment

Figure 7:
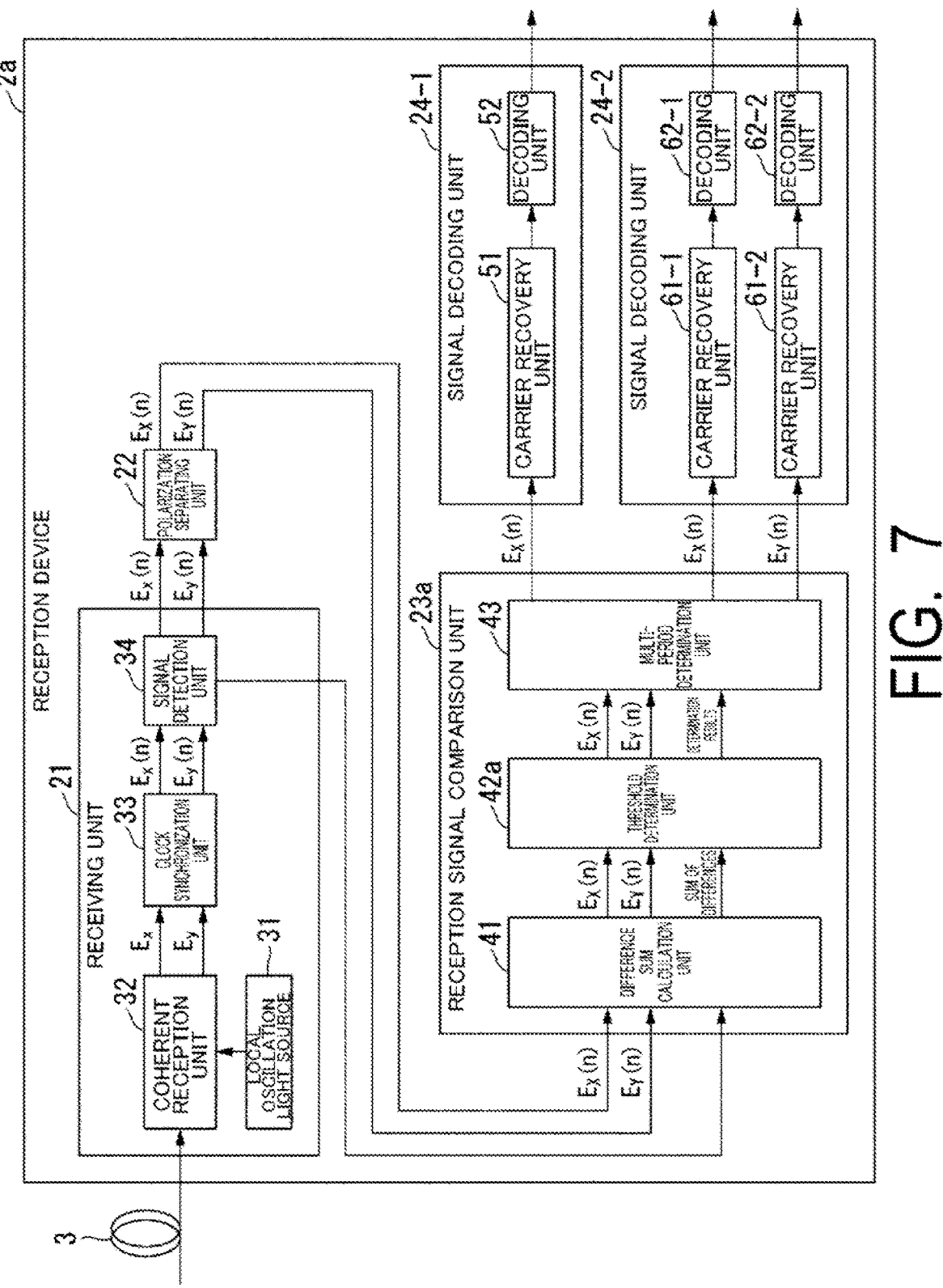
FIG. 7 is a block diagram illustrating a configuration of a reception device according to a second embodiment.

FIG. 7 is a block diagram illustrating a configuration of a reception device 2a according to a second embodiment. For the second embodiment, identical configurations to the first embodiment have been allocated the same reference symbols, and only different configurations from the first embodiment will be described below. A transmission system of the second embodiment is provided with the transmission device 1, the reception device 2a, and the optical fiber transmission path 3. When indicating the transmission system of the second embodiment, it is denoted by a "transmission system 100a" using a reference symbol "100a".

The reception device 2a is provided with a receiving unit 21. a polarization separating unit 22. a reception signal comparison unit 23a, and signal decoding units 24-1 and 24-2. The reception signal comparison unit 23a has a difference sum calculation unit 41, a threshold determination unit 42a, and a multi-period determination unit 43.

The threshold determination unit 42a determines whether change patterns of the reception signal $E_x(n)$ and the reception signal $E_y(n)$ are similar to each other in a predetermined fixed period, based on the sum of absolute differences calculated by the difference sum calculation unit 41 and a predetermined threshold. The threshold determination unit 42a outputs the reception signals $E_x(n)$ and $E_y(n)$, as well as the determination result, to the multi-period determination unit 43.

The multi-period determination unit 43 collects the determination results output by the threshold determination unit 42a every several fixed periods, and determines whether the change patterns of the reception signals $E_x(n)$ and $E_y(n)$ are similar to each other based on the collected determination results. In a case where it is determined that the change patterns are similar to each other, the multi-period determination unit 43 outputs one of the reception signals $E_x(n)$ and $E_y(n)$ to the signal decoding unit 24-1. In a case where it is determined that the change patterns are not similar to each other, the multi-period determination unit 43 outputs both the reception signals $E_x(n)$ and $E_y(n)$, output by the threshold determination unit 42a, to the signal decoding unit 24-2. (Processing by Reception Device of Second Embodiment)

Figure 8:
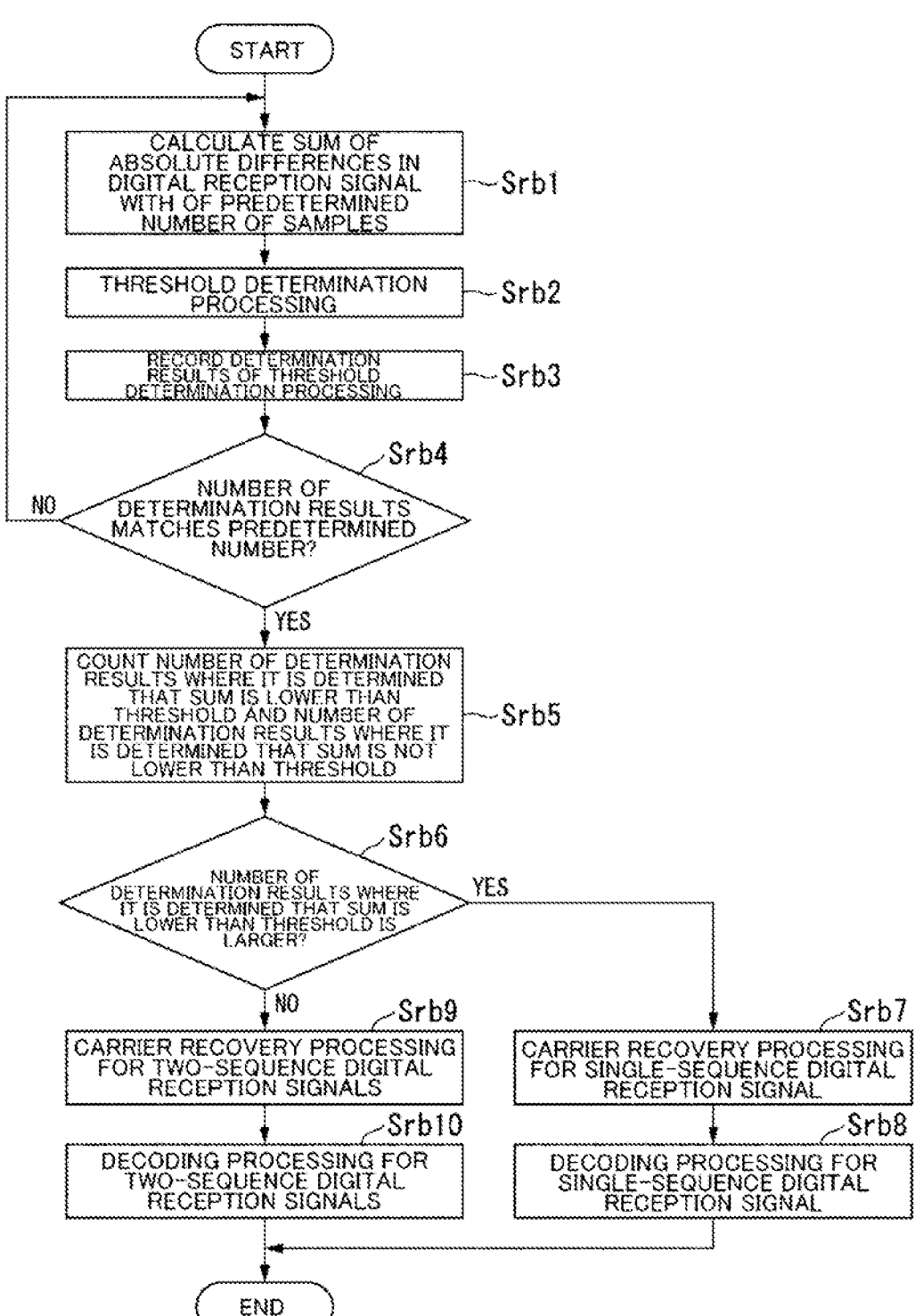
FIG. 8 is a block diagram illustrating a flow of processing by the reception device according to the second embodiment.

FIG. 8 is a flowchart illustrating a flow of processing performed by the reception signal comparison unit 23a and the signal decoding units 24-1 and 24-2 in the reception device 2a. As in the first embodiment, while the transmission device 1 keeps transmitting the optical signal, the receiving unit 21 and the polarization separating unit 22 in the reception device 2a keep executing the processing above.

When the difference sum calculation unit 41 of the reception signal comparison unit 23a receives the signal detection information from the signal detection unit 34, the processing of the flowchart shown in FIG. 8 is initiated. The difference sum calculation unit 41 executes the same processing as that in step Sra1 shown in FIG. 6 (step Srb1).

The threshold determination unit 42a takes in the reception signals $E_x(n)$ and $E_y(n)$ output by the difference sum calculation unit 41, and outputs the taken reception signals $E_x(n)$ and $E_y(n)$ to the multi-period determination unit 43. The threshold determination unit 42a determines that the change patterns of the reception signals $E_x(n)$ and $E_y(n)$ are similar to each other, in a case where the sum of absolute differences calculated by the difference sum calculation unit 41 is lower than a predetermined threshold. Meanwhile, the threshold determination unit 42a determines that the change patterns of the reception signals $E^X(n)$ and $E^Y(n)$ are not similar to each other in a case where the sum of absolute differences calculated by the difference sum calculation unit 41 is not lower than a predetermined threshold. The threshold determination unit 42a outputs the determination result to the multi-period determination unit 43 (step Srb2).

The multi-period determination unit 43 takes in the reception signals $E_x(n)$ and $E_y(n)$ output by the threshold determination unit 42a. and writes and stores the taken reception signals $E_x(n)$ and $E_y(n)$ in a buffer area provided in an internal storage area. The multi-period determination unit 43 takes in the determination result output by the threshold determination unit 42a, and writes and stores the taken determination result in the internal storage area. The multi-period determination unit 43 counts the number of determination results stored in the internal storage area, and determines whether the counted number of determination results matches a predetermined number. The predetermined number is an integer of 2 or more (step Srb4).

In a case where it is determined that the counted number of determination results stored in the internal storage area does not match the predetermined number (step Srb4: NO). the multi-period determination unit 43 waits for the threshold determination unit 42a to output the next determination result via the processing of steps Srb1 and Srb2 performed by the difference sum calculation unit 41 and the threshold determination unit 42a. When the threshold determination unit 42a outputs the next determination result, the multi-period determination unit 43 executes the processing of steps Srb3 and SRB4 again.

In a case where it is determined that the counted number of determination results stored in the internal storage area matches the predetermined number (step Srb4: YES), the multi-period determination unit 43 counts the number of determination results where it is determined that the sum is lower than the threshold, and also the number of determination results where it is determined that the sum is not lower than the threshold, among the determination results stored in the internal storage area (step Srb5). The multi-period determination unit 43 determines whether the change patterns of the reception signals $E_x(n)$ and $E_y(n)$ are similar to each other, based on determination on whether the number of determination results where it is determined that the sum is lower than the threshold is larger than the number of determination results where it is determined that the sum is not lower than the threshold (step Srb6).

The multi-period determination unit 43 determines that the change patterns of the reception signals $E_x(n)$ and $E_y(n)$ are similar to each other in a case where the number of determination results where it is determined that the sum is lower than the threshold is larger than the number of determination results where it is determined that the sum is not lower than the threshold (step Srb6: YES). When the change patterns of the reception signals $E_x(n)$ and $E_y(n)$ are similar to each other, it is understood as that the optical signal transmitted by the transmission device 1 is generated by the first single polarization modulation scheme or the second single polarization modulation scheme. Accordingly, the multi-period determination unit 43 outputs one of the reception signals $E_x(n)$ and $E_y(n)$ stored in the buffer area provided in the internal storage area to the signal decoding section 24-1, and clears the reception signals $E_x(n)$ and $E_y(n)$ stored in the buffer area. In this case, the multi-period determination unit 43 outputs the reception signal EX(n) to the signal decoding unit 24-1. Thereafter, the same processing as the processing in step Sra3 is executed by the carrier recovery unit 51 (step Srb7), and the same processing as the processing in step Sr4 is executed by the decoding unit 52 (step Srb8).

Meanwhile, the multi-period determination unit 43 determines that the change patterns of the reception signals $E_x(n)$ and $E_y(n)$ are not similar to each other in a case where the number of determination results where it is determined that the sum is lower than the threshold is not larger than the number of determination results where it is determined that the sum is not lower than the threshold (step Srb6: NO). When the change patterns of the reception signals $E_x(n)$ and $E_y(n)$ are not similar to each other, it is understood as that the optical signal transmitted by the transmission device 1 is generated by the polarization multiplexing modulation scheme. Accordingly, the multi-period determination unit 43 outputs the reception signal $E_x(n)$ stored in the buffer area provided in the internal storage area to the carrier recovery unit 61-1 of the signal decoding unit 24-2, outputs the reception signal $E_y(n)$ to the carrier recovery unit 61-2 of the signal decoding unit 24-2, and clears the reception signals $E_X(n)$ and $E_Y(n)$ stored in the buffer area. Thereafter, the same processing as the processing in step Sra5 is executed by the carrier recovery units 61-1 and 61-2 (step Srb9), and the same processing as the processing in step Sra6 is executed by the decoding units 62-1 and 62-2 (step Srb10).

In the reception device 2a of the second embodiment, the reception signal comparison unit 23a collects the determination results, in which it is determined whether the change patterns of the reception signals $E_X(n)$ and $E_Y(n)$ are similar to each other based on the change patterns of the reception signals $E_X(n)$ and $E_Y(n)$ for the predetermined fixed period, every several fixed periods, and determines whether the change patterns of the reception signals $E_X(n)$ and $E_Y(n)$ are similar to each other based on the collected determination results. Depending on the polarization state at the time of receiving the optical signal, the polarization separating unit 22 may not perform polarization separation with high accuracy in a short sampling period. In such a case, by employing the reception device 2a of the second embodiment, the reception signal comparison unit 23a provided with the multi-period determination unit 43 can determine whether the change patterns of the reception signals $E_X(n)$ and $E_Y(n)$ are similar to each other with respect to the lager number of reception signals $E_X(n)$ and $E_Y(n)$ within a longer period than that of the first embodiment. Consequently, the reception device 2a of the second embodiment can determine the modulation scheme of the received optical signal more accurately than the reception device 2 of the first embodiment, in addition to the advantageous effects of the reception device 2 of the first embodiment.

Third Embodiment

Figure 9:
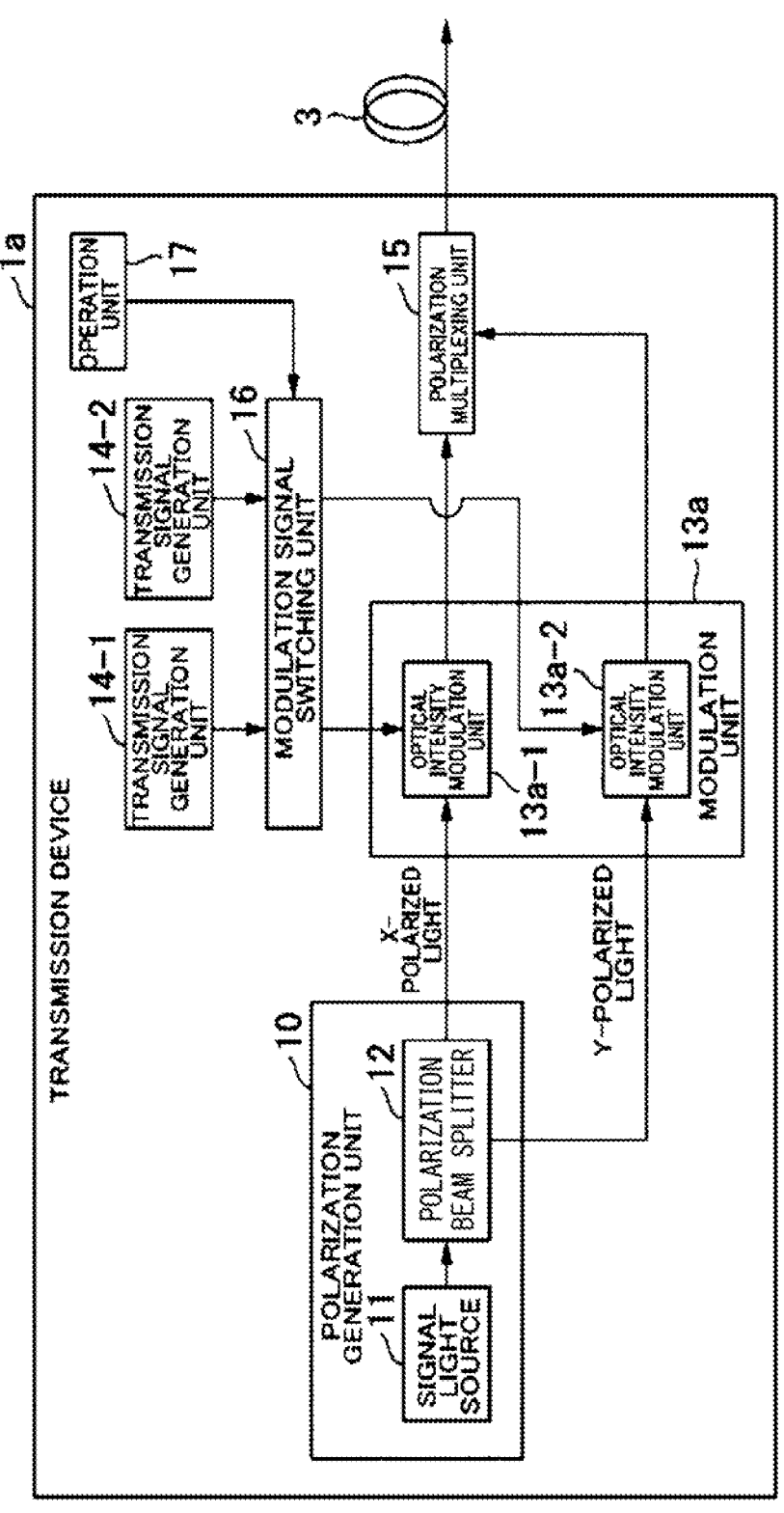
FIG. 9 is a block diagram illustrating a configuration of a transmission device according to a third embodiment.
Figure 10:
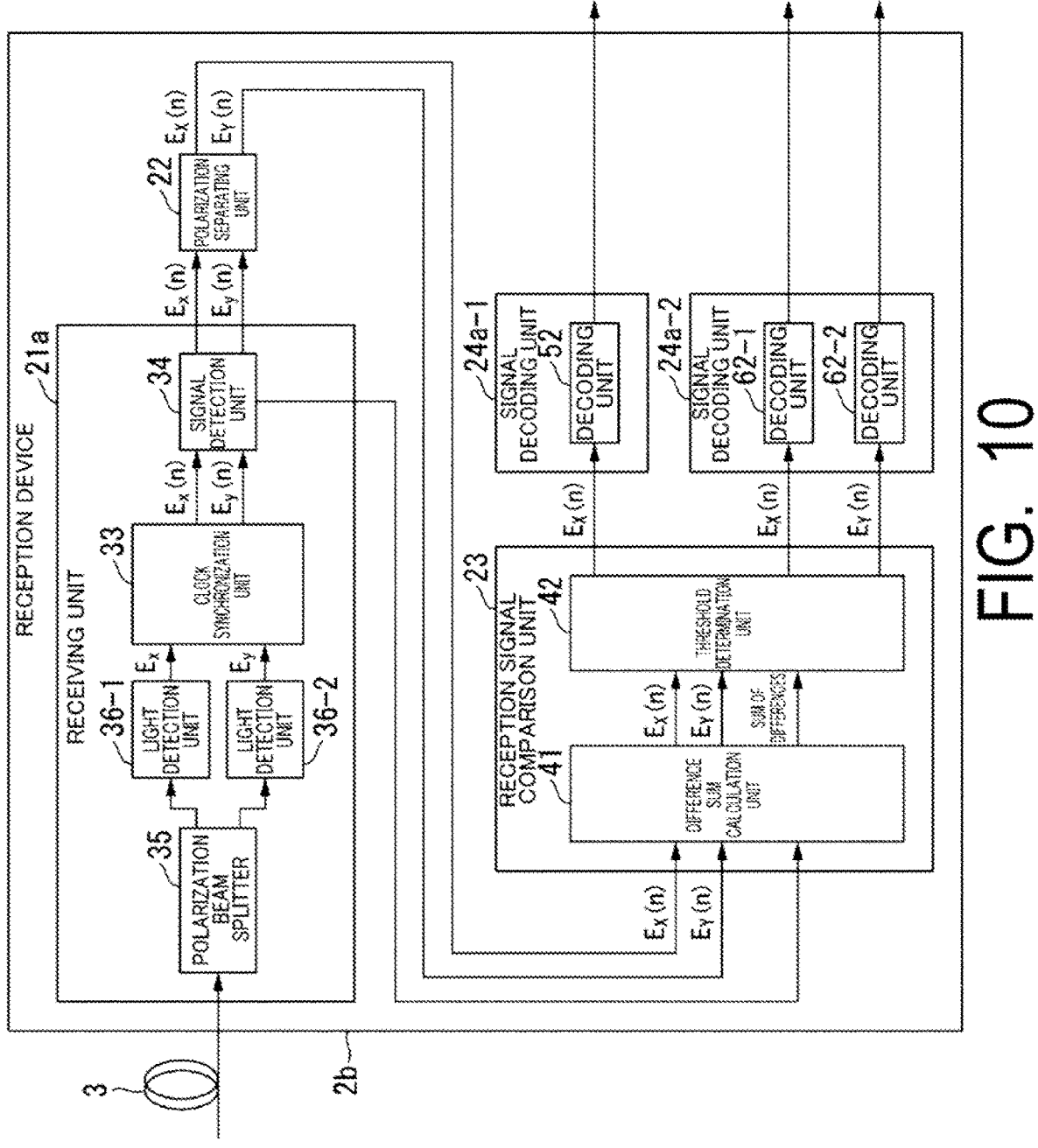
FIG. 10 is a block diagram illustrating a configuration of a reception device according to the third embodiment.

FIG. 9 is a block diagram illustrating a configuration of a transmission device 1 a according to a third embodiment. FIG. 10 is a block diagram illustrating a configuration of a reception device 2b according to the third embodiment. A transmission system of the third embodiment is provided with the transmission device 1a. the reception device 2b, and the optical fiber transmission path 3. When indicating the transmission system of the third embodiment, it is denoted by a "transmission system 100b" using a reference symbol "100b". For the third embodiment, identical configurations to the first and second embodiments have been allocated the same reference symbols, and only different configurations from the first and second embodiments will be described below.

(Transmission Device of Third Embodiment)

As shown in FIG. 9, the transmission device ia includes a polarization generation unit 10, a modulation unit 13a, transmission signal generation units 14-1 and 14-2, a polarization multiplexing unit 15. a modulation signal switching unit 16, and an operation unit 17. The modulation unit 13a includes optical intensity modulation units 13a-1 and 13a-2. That is, the transmission device 1a includes the optical intensity modulation units 13a-1 and 13a-2 for performing optical intensity modulation in place of the IQ modulation units 13-1 and 13-2 in the transmission device 1 of the first embodiment. Each of the optical intensity modulation units 13a-1 and 13a-2 modulates OOK (on-off keying) based on a transmission signal given to each of the X-polarized light and the Y-polarized light given to each of the optical intensity modulation units 13a-1 and 13a-2. Therefore, in a case where a transmission signal generated by the transmission signal generation unit 14-1 is given to the optical intensity modulation unit 13a-1 and a transmission signal generated by the transmission signal generation unit 14-2 is given to the optical intensity modulation unit 13a-2. the transmission device 1a performs polarization multiplexed OOK modulation on light output by the signal light source 11.

The processing of the transmission device 1a of the third embodiment is the same as the processing of the transmission device 1 of the first embodiment shown in FIG. 5, except for that intensity modulation is executed, instead of phase modulation, by the optical intensity modulation units 13a-1 and 13a-2 in the processing of steps Sta4-1, Sta4-2, Sta4-3.

(Reception Device of Third Embodiment)

As shown in FIG. 10, the reception device 2b is provided with a receiving unit 21a. a polarization separating unit 22, a reception signal comparison unit 23, and signal decoding units 24a-1 and 24a-2. The receiving unit 21a includes a polarization beam splitter 35, light detection units 36-1 and 36-2, a clock synchronization unit 33, and a signal detection unit 34. The polarization beam splitter 35 receives an optical signal transmitted by the optical fiber transmission path 3, and separates the received optical signal into X-polarized light and Y-polarized light.

The light detection unit 36-1 takes in the X-polarized light separated and output by the polarization beam splitter 35, detects the intensity of the taken X-polarized light, and detects an optical intensity amplitude component as an analogue electric signal. The light detection unit 36-1 performs A/D conversion on the optical intensity amplitude component detected. and converts the optical intensity amplitude component corresponding to the X-polarized light into a reception signal E, which is a digital electric signal. The light detection unit 36-2 takes in the Y-polarized light separated and output by the polarization beam splitter 35, detects the intensity of the taken Y-polarized light, and detects an optical intensity amplitude component as an analogue electric signal. The light detection unit 36-2 perforns A/D conversion on the optical intensity amplitude component detected, and converts the optical intensity amplitude component corresponding to the Y-polarized light into a reception signal $E_y$, which is a digital electric signal.

The signal decoding unit 24a-1 includes a decoding unit 52. The signal decoding unit 24a-2 includes decoding units 62-1 and 62-2. In the third embodiment, the signal decoding units 24a-1 and 24a-2 are not provided with the carrier recovery units 51, 61-1 and 61-2. different from the first and second embodiments; because the optical signal received by the reception device 2*a* is subject to intensity modulation instead of phase modulation, it does not need frequency offset compensation and phase compensation.

The processing in the reception device 2*b* of the third embodiment is the same as the processing by the reception device 2 of the first embodiment, except for that the processing executed by the coherent reception unit 32 of the receiving unit 21 in the first embodiment is replaced by the processing executed by the polarization beam splitter 35 and the light detection unit 36-1 and 36-2, and the processing by the carrier recovery units 51, 61-1 and 61-2 in the first embodiment is omitted.

In the third embodiment, even if the transmission device 1 a transmits the optical signal subject to the intensity modulation with any of the polarization multiplexing modulation scheme, the first single polarization modulation scheme and the second single polarization modulation scheme, the reception device 2*b* switches and uses appropriate signal decoding units 24*a*-1 and 24*a*-2 according to the modulation scheme deternined by the reception signal comparison unit 23, and arithmetic resources can be appropriately used, leading to enhanced resource efficiency and reduced power consumption. In other words, even if a modulation scheme using polarized waves applied to the transmission device 1*a* is unknown, the modulation scheme is specified based on a signal received by the reception device 2*b* to select. arithmetic resources used in accordance with the specified modulation scheme, thus it is possible to demodulate a signal transmitted by the transmission device 1*a* with a simple configuration while suppressing arithmetic resources used.

(Other Configuration Examples of Embodiments)

In the third embodiment, the reception signal comparison unit 23 of the reception device 2*b* may be replaced with the reception signal comparison unit 23*a* provided in the reception device 2*a* of the second embodiment. The reception device 2*b* where the reception signal comparison unit 23 is replaced by the reception signal comparison unit 23*a* can determine the modulation scheme of the received optical signal more accurately than the reception device 2*b* of the third embodiment, in addition to the advantageous effects of the reception device 2*b* of the third embodiment.

Figure 11:
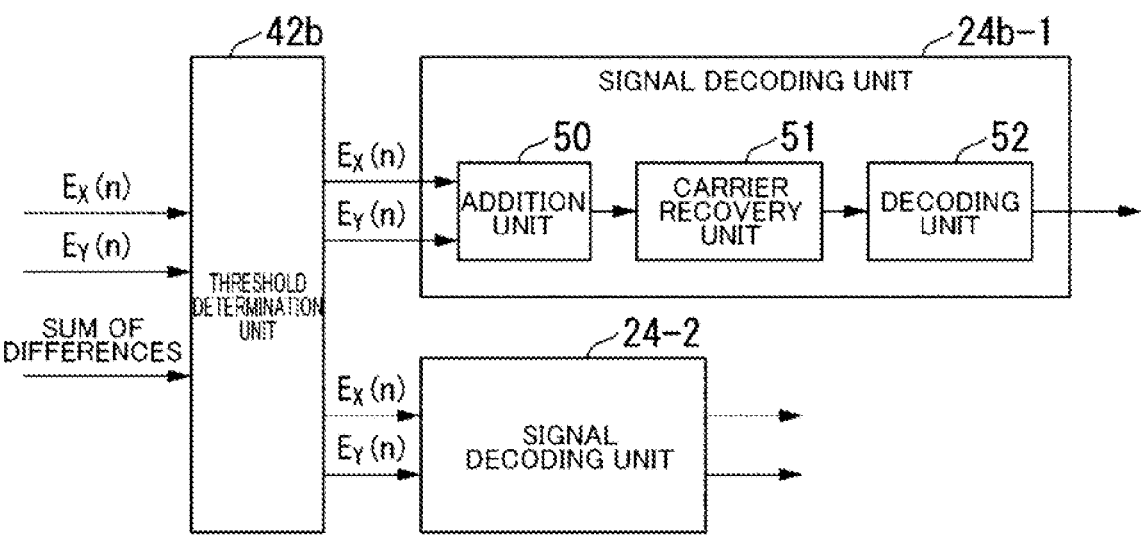
FIG. 11 is a block diagram illustrating another configuration example of the reception device according to the first enbodiment.
Figure 12:
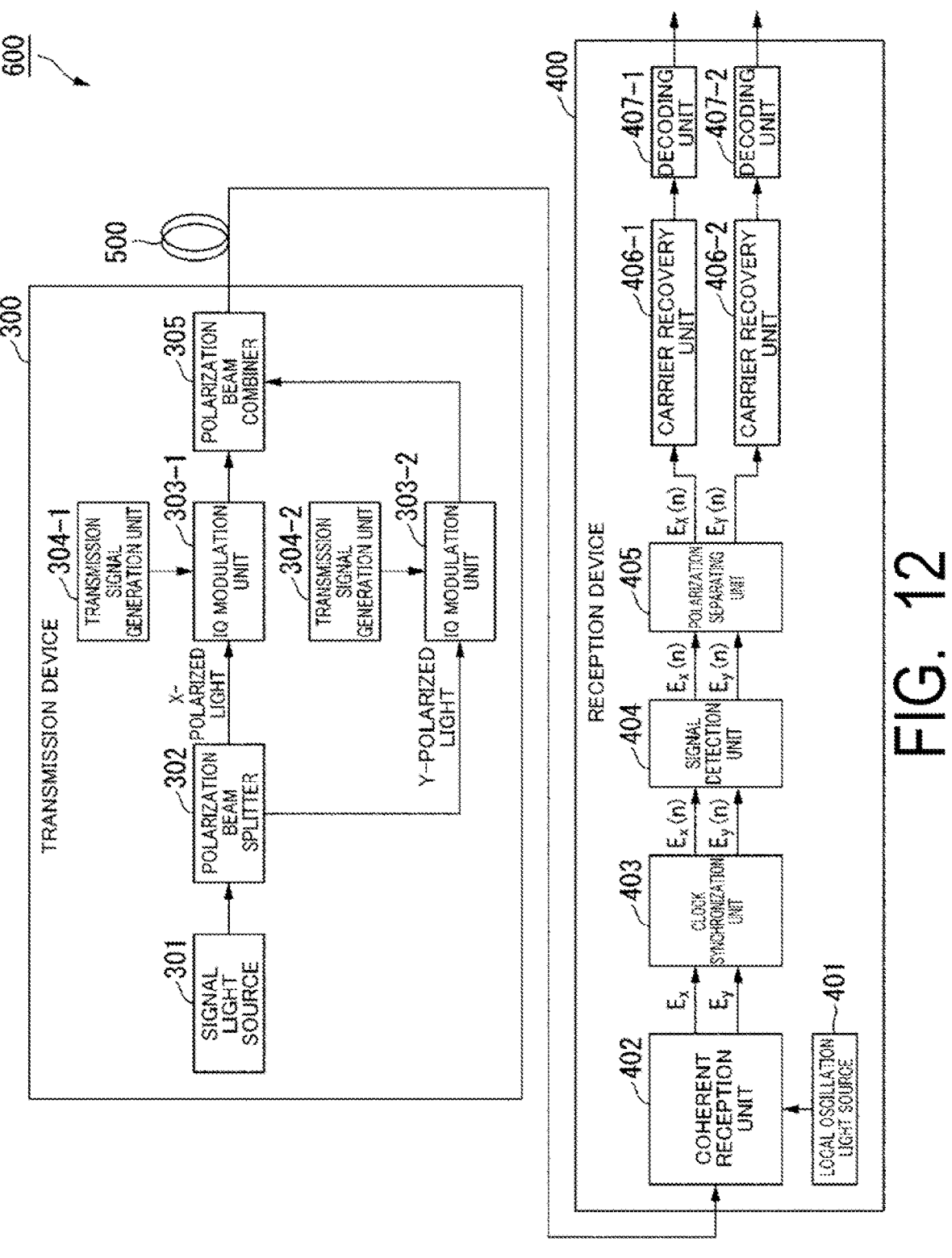
FIG. 12 is a block diagram illustrating a configuration of a typical transmission system employing polarization multiplexing and digital coherent technology.

As another example of the configuration of the first embodiment, the threshold determination unit 42*b* shown in FIG. 11 may be adopted instead of the threshold determination unit 42 provided in the reception device 2 of the first embodiment, and the signal decoding unit 24*b*-1 shown in FIG. 11 may be adopted instead of the signal decoding unit 24-1. The signal decoding unit 24*b*-1 is different from the signal decoding unit 24-1 of the first embodiment in that the signal decoding unit 24*b*-1 includes an addition unit 50. in addition to the carrier recovery unit 51 and the decoding unit 52. The threshold determination unit 42*b* has the same configuration as that of the threshold determination unit 42 of the first embodiment except for that the threshold determination unit 42*b* outputs both the reception signals $E_X(n)$ and $E_Y(n)$ to the signal decoding unit 24-1 in a case where it is determined that the change patterns of the reception signals $E_X(n)$ and $E_Y(n)$ are similar to each other in step Sra2 shown in FIG. 6. As described above, in a case of employing the first or.second single polarization modulation scheme, the reception signal $E_X(n)$ and the reception signal Ev(n) become substantially the same signal. Therefore, the carrier recovery unit 51 performs carrier recovery processing on a reception signal $E_X(n)+E_Y(n)$ obtained by adding the reception signal $E_X(n)$ and the reception signal $E_Y(n)$ by the addition unit 50, and then the reception signal $E_X(n)+E_Y(n)$ subject to the carrier recovery processing is decoded by the decoding unit 52, thereby decoding the transmission signal generated by the transmission signal generation unit 14-1. That is. the signal decoding unit 24-1 of the first embodiment decodes a single-sequence transmission signal from any one of single-sequence transmission signals among two-sequence transmission signals $E_X(n)$ and $E_Y(n)$. while the signal decoding unit 24*b*-1 decodes a single-sequence transmission signal by generating a single-sequence transmission signal from two-sequence transmission signals $E_X(n)$ and $E_Y(n)$.

Similar to the configuration as shown in FIG. 11, the signal decoding unit 24-1 provided in the reception device 2*a* of the second embodiment may be replaced by the signal decoding unit 24*b*-1, and the multi-period determination unit 43 provided in the reception signal comparison unit 23*a* may output both the reception signals $E_X(n)$ and $E_Y(n)$ to the signal decoding unit 24*b*-1 in a case where the change pattern of the reception signals $E_X(n)$ and $E_Y(n)$ are the similar to each other in step Srb6 shown in FIG. 8. In the reception device 2*b* of the third embodiment, the threshold determination unit 42*b* may be provided instead of the threshold determination unit 42, the signal decoding unit 24*a*-1 may be provided with the addition unit 50, and the addition unit 50 may be connected to the threshold determination unit 42*b* and the decoding unit 52.

In the first and second embodiments described above, as an example, the IQ modulation units 13-1 and 13-2 of the transmission device 1 modulate by a modulation scheme QSPK. On the other hand, the IQ modulation units 13-1 and 13-2 may adopt a high multi-value modulation scheme such as 16QAM (quadrature amplitude modulation), instead of QPSK. In this case, the reception devices 2 and 2*a* need to have a polarization separating unit as disclosed in the following reference for performing polarization separation with the high multi-value modulation scheme in place of the polarization separating unit 22. The coherent reception unit 32 provided in the reception devices 2 and 2*a* needs to be provided with a configuration for performing coherent detection of an optical signal modulated by the high multi-value modulation scheme.

[Reference: Irshaad Fatadin, et al., "Blind Equalization and Carrier Phase Recovery in a 16-QAM Optical Coherent System", JOURNAL OF LIGIHTWAVE TECHNOLOGY, VOL, 27, No. 15, AUGUST 1, 2009]

For the first to third embodiments and the other configuration examples of the respective embodiments, in a case where common functional units, for example. the carrier recovery units 51, 61-1 and 61-2 and the decoding units 52.62-1 and 62-2 in the reception device 2 are configured by hardware, they may share a circuit; in a case where those units are configured by software, they may share a function.

For the first to third embodiments and the other configuration examples of the respective embodiments, in the reception devices 2 and 2*b*, the threshold determination unit 42 outputs the reception signal $E_X(n)$ to the signal decoding units 24-1 and 24*a*-1, respectively, in a case where it is determined that the change patterns of the reception signals $E_X(n)$ and $E_Y(n)$ are similar to each other in step Sra2 shown in FIG. 6. On the other hand, the threshold determination unit 42 may output the reception signal $E_Y(n)$ to the signal decoding units 24-1 and 24*a*-1, respectively, in a case where it is determined that the change patterns of the reception signals $E_X(n)$ and $E_Y(n)$ are similar to each other in step Sra2. The multi-period determination unit 43 may output the reception signal $E_X(n)$ to the signal decoding unit 24-1 in a case where it is determined that the change patterns of the reception signals $E_X(n)$ and $E_Y(n)$ are similar to each other in step Srb6 shown in FIG. 8. On the other hand, the multi-period determination unit 43 may output the reception signal $E_Y(n)$ to the signal decoding unit 24-1 in a case where it is determined that the change patterns of the reception signals $E_X(n)$ and $E_Y(n)$ are similar to each other in step Srb6.

For the first to third embodiments and the other configuration examples of the respective embodiments, the difference sum calculation unit 41 selects, when receiving the signal detection information from the signal detection unit 34, N reception signals $E_X(n)$ and $E_Y(n)$ being consecutive in time series, starting from the reception signals $E_X(n)$ and $E_Y(n)$ taken in at the time when receiving the signal detection information. On the other hand, the difference sum calculation unit 41 may select, when receiving the signal detection information from the signal detection unit 34, N reception signals $E_X(n)$ and $E_Y(n)$ being consecutive in time series, located before and after the reception signals $E_X(n)$ and $E_Y(n)$, in addition to those reception signals $E_X(n)$ and $E_Y(n)$, not starting front the reception signals $E_X(n)$ and $E_Y(n)$ taken in at the time when receiving the signal detection information.

For the first to third embodiments and the other configuration examples of the respective embodiments, the threshold determination units 42 and 42a determine whether the sum of absolute differences is lower than the predetermined threshold in the processing of steps Sra2 (FIG. 6) and Srb2 (FIG. 8). respectively. On the other hand, the threshold determination units 42 and 42a may determine whether the sum of absolute differences is equal to or larger than the threshold depending on how to determine the threshold. The multi-period determination unit 43 determines whether the number of determination results where it is determined that the sum is lower than the threshold is larger than the number of determination results where it is determined that the sum is not lower than the threshold in the processing of step Srb6 shown in FIG. 8. On the other hand, the multi-period determination unit 43 determines whether the number of determination results where it is determined that the sum is lower than the threshold is equal to or larger than the number of determination results where it is determined that the sum is not lower than the threshold in the processing of step Srb6 shown in FIG. 8.

For the first to third embodiments and the other configuration examples of the respective embodiments, the operation unit 17 receives the operation from the user, and outputs the information indicating any one modulation scheme selected from the polarization multiplexing modulation scheme, the first single polarization modulation scheme, and the second single polarization modulation scheme. On the other hand, an external device may be connected to the operation unit 17 so that the user operates the operation unit 17 via the external device, and the operation unit 17 may receive a request front an application executed in the external device and outputs the information indicating a modulation scheme.

For the first to third embodiments and the other configuration examples of the respective embodiments, the transmission devices 1 and 1a may generate radio signals instead of optical signals and radiate them into the air, and the reception devices 2, 2a and 2b each may have a configuration for receiving a radio signal.

The operation unit 17, the transmission signal generation units 14-1 and 14-2. the modulation signal switching unit 16, the polarization separating unit 22, the reception signal comparison units 23 and 23a, and the signal decoding units 24-1, 24-2. 24a-1, 24a-2 and 24b-1 in the embodiments as stated above may be implemented by a computer. In this case, they may be implemented by recording the program for implementation of these functions on a computer-readable recording medium, reading the program recorded in the recording medium into the computer system, and executing them. The "computer system" herein includes OS and hardware such as peripheral equipment. The "computer-readable recording medium" includes a portable medium such as a flexible disc, a magneto-optical disc, a ROM, and a CD-ROM, and a storage device such as a hard disk built in the computer system. The "computer-readable recording medium" may also include a recording medium that dynamically holds a program for a short time period such as a communication wire when the program is to be transmitted via a network such as the Internet or a communication line such as a telephone line, as well as a recording medium that holds a program for a certain time period such as a volatile memory inside a computer system serving as a server or a client in that case. Moreover, the program described above may be any of a program for implementing some of the functions described above, a program capable of implementing the functions described above in combination with a program already recorded in the computer system, and a program for implementing the functions by using a programmable logic device such as a field-programmable gate array (FPGA).

Although the embodiments of the present invention have been described in detail with reference to the drawings, a specific configuration is not limited to these embodiments, and designs within the scope of the gist of the present invention are included.

INDUSTRIAL APPLICABILITY

The present invention can be applied to a reception device for receiving a signal modulated by a polarization multiplexing modulation scheme or a single polarization modulation scheme.

REFERENCE SIGNS LIST

1: Transmission device
2: Reception device
3: Optical fiber transmission path
10: Polarization generation unit
11: Signal light source
12: Polarization beam splitter
13: Modulation unit
13-1, 13-2: IQ modulation unit
14-1. 14-2: Transmission signal generation unit
15: Polarization multiplexing unit
16: Modulation signal switching unit
17: Operation unit
21: Receiving unit
22: Polarization separating unit
23: Reception signal comparison unit
24-1. 24-2: Signal decoding unit
31: Local oscillation light source
32: Coherent reception unit
33: Clock synchronization unit
34: Signal detection unit
41: Difference sum calculation unit
42: Threshold determination unit
51. 61-1. 61-2: Carrier recovery unit

42, 62-1, 62-2: Decoding unit

100: Transmission system

The invention claimed is:

1. A reception device, comprising:
a receiver configured to receive a signal in which an X-polarized wave and a Y-polarized wave are polarization-multiplexed, convert the received signal into reception signals respectively corresponding to the X-polarized wave and the Y-polarized wave, and outputs the reception signals;
a polarization separator configured to perform polarization-separation on the reception signals respectively corresponding to the X-polarized wave and the Y-polarized wave, output from the receiver;
a first signal decoder configured to decode a single-sequence transmission signal from the given reception signals;
a second signal decoder configured to decode a two-sequence transmission signal from the given reception signals; and
a reception signal comparer configured to determine whether change patterns in the reception signals respectively corresponding to the X-polarized wave and the Y-polarized wave separated by the polarization separator are similar to each other, output the reception signals obtained by polarization-separation by the polarization separator to the first signal decoder in a case where the change patterns are similar to each other, and output the reception signals obtained by polarization-separation by the polarization separator to the second signal decoder in a case where the change patterns are not similar to each other.

2. The reception device according to claim 1, wherein the reception signal comparer is configured to determine whether change patterns in the reception signals respectively corresponding to the X-polarized wave and the Y-polarized wave, separated by the polarization separator, are similar to each other, based on the change patterns in the reception signals respectively corresponding to the X-polarized wave and the Y-polarized wave in a predetermined period.

3. The reception device according to claim 1, wherein the reception signal comparer is configured to:
collect determination results every predetermined period, the determination results obtained from a determination whether change patterns in the reception signals respectively corresponding to the X-polarized wave and the Y-polarized wave are similar to each other based on the change patterns in the reception signals respectively corresponding to the X-polarized wave and the Y-polarized wave in the predetermined period, and
determine whether change patterns in the reception signals respectively corresponding to the X-polarized wave and the Y-polarized wave are similar to each other based on a plurality of collected determination results.

4. The reception device according to claim 2, wherein the reception signal comparer is configured to determine whether change patterns in the reception signals respectively corresponding to the X-polarized wave and the Y-polarized wave are similar to each other, based on the sum of absolute values of differences between the reception signals respectively corresponding to the X-polarized wave and the Y-polarized wave in the predetermined period.

5. The reception device according to claim 1, wherein
the reception signal comparer is configured to output one of the reception signals respectively corresponding to the X-polarized wave and the Y-polarized wave, separated by the polarization separator, to the first signal decoder, in a case where it is determined that change patterns in the reception signals respectively corresponding to the X-polarized wave and the Y-polarized wave are similar to each other, and
the first signal decoder is configured to decode a single-sequence transmission signal from the reception signal corresponding to either one of the X-polarized wave and the Y-polarized wave, output by the reception signal comparer.

6. The reception device according to claim 1, wherein
the reception signal comparer is configured to output both the reception signals respectively corresponding to the X-polarized wave and the Y-polarized wave, separated by the polarization separator, to the first signal decoder, in a case where it is determined that change patterns in the reception signals respectively corresponding to the X-polarized wave and the Y-polarized wave are similar to each other, and
the first signal decoder is configured to add the reception signals respectively corresponding to the X-polarized wave and the Y-polarized wave, output by the reception signal comparer, and decode a single-sequence transmission signal from the added reception signals.

7. The reception device according to claim 1, wherein
a signal received by the receiver, in which the X polarized wave and the Y polarized wave are polarization-multiplexed, is a signal in which the X-polarized wave and the Y-polarized wave are modulated by different transmission signals, respectively; or
a signal in which the X-polarized wave and the Y-polarized wave are modulated by the same transmission signal; or
a signal in which either one of the X polarized wave and the Y polarized wave is modulated by a transmission signal.

8. A reception method, comprising:
by a receiver, receiving a signal in which an X-polarized wave and a Y-polarized wave are polarization-multiplexed, converting the received signal into reception signals respectively corresponding to the X-polarized wave and the Y-polarized wave, and outputting the reception signals;
by a polarization separator, performing polarization-separation on the reception signals respectively corresponding to the X-polarized wave and the Y-polarized wave, output from the receiver;
by a reception signal comparer, determining whether change patterns in the reception signals respectively corresponding to the X-polarized wave and the Y-polarized wave separated by the polarization separator are similar to each other, outputting the reception signals obtained by polarization-separation by the polarization separator to a first signal decoder in a case where the change patterns are similar to each other, and outputting the reception signals obtained by polarization-separation by the polarization separator to a second signal decoder in a case where the change patterns are not similar to each other; and
by the first signal decoder, decoding a single-sequence transmission signal from the reception signals output by the reception signal comparer; and
by the second signal decoder, decoding a two-sequence transmission signal from the reception signals output by the reception signal comparer.

* * * * *